(12) United States Patent
Kato et al.

(10) Patent No.: US 6,680,979 B2
(45) Date of Patent: Jan. 20, 2004

(54) METHOD AND DEVICE FOR COMMUNICATION

(75) Inventors: Masataka Kato, Tokyo (JP); Tsuyoshi Kobayashi, Tokyo (JP); Yoshiaki Koizumi, Tokyo (JP); Wataru Matsumoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 201 days.

(21) Appl. No.: 09/849,992

(22) Filed: May 8, 2001

(65) Prior Publication Data

US 2001/0028678 A1 Oct. 11, 2001

Related U.S. Application Data

(63) Continuation of application No. PCT/JP00/04289, filed on Jun. 29, 2000.

(30) Foreign Application Priority Data

Sep. 17, 1999 (JP) ............................................ 11-264545

(51) Int. Cl.[7] .............................................. H04L 27/28
(52) U.S. Cl. ...................................... 375/260; 370/437
(58) Field of Search ................................ 375/222, 219, 375/220, 260; 370/225, 228, 343, 437, 468

(56) References Cited

U.S. PATENT DOCUMENTS

| 5,903,608 | A | | 5/1999 | Chun | |
|---|---|---|---|---|---|
| 6,175,550 | B1 | * | 1/2001 | van Nee | 370/206 |
| 6,208,669 | B1 | * | 3/2001 | Cimini et al. | 370/203 |

FOREIGN PATENT DOCUMENTS

| JP | 9 51328 | 2/1997 |
|---|---|---|
| JP | 2000 45763 | 2/2000 |
| JP | 2000 165304 | 6/2000 |
| JP | 2000 216752 | 8/2000 |
| JP | 2000 244444 | 9/2000 |
| WO | 00 36776 | 6/2000 |
| WO | 01 22635 | 3/2001 |

* cited by examiner

Primary Examiner—Stephen Chin
Assistant Examiner—Kevin Kim
(74) Attorney, Agent, or Firm—Birch, Stewart, Kolasch & Birch, LLP

(57) ABSTRACT

A transmission line is monitored while the communication is held in a steady state and moving a tone set if there are no tones securing a predetermined value of an S/N ratio. The tone set is not moving if there are at least two tones securing the S/N ratio. The tone set is moved by the predetermined method if there is one tone securing the S/N ratio and it is judged that communication quality can be maintained by moving the tone set in a same tone group. The tone group moved if it is judged that the communication quality cannot be maintained even by executing movement of the tone set in the same tone group.

19 Claims, 24 Drawing Sheets

FIG.2

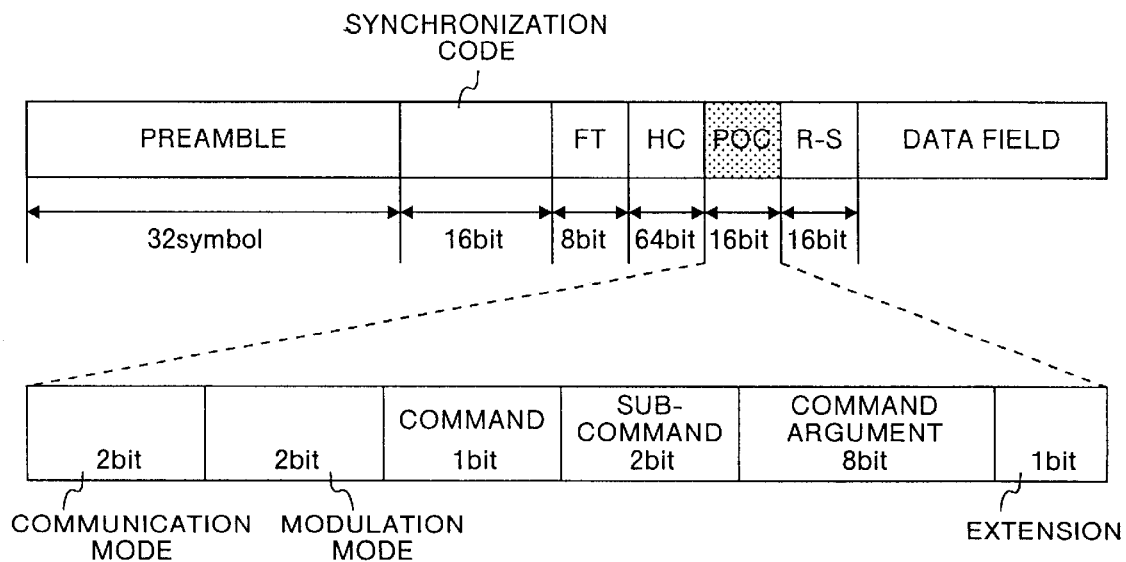

FIG.3a

| MODULATION MODE (2bit) | DQPSK [00] |
| --- | --- |
| | DBPSK [01] |
| | DBPSK + TIME DIVERSITY [10] |
| | Reserved [11] |

FIG.3b

| COMMAND (2bit) | SUB-COMMAND (2bit) | COMMAND ARGUMENT (8bit) SETTING INFORMATION (GROUP:4bit, SET POSITION:2bit, MODULATION:2bit) |
| --- | --- | --- |
| PSEUDO COMMAND [0] | NOP [00] | REQUEST SETTING [g g g g p p m m] |
| | DUMMY [01] | CURRENT SETTING [g g g g p p m m] |
| COMMUNICATION SETTING CHANGE [1] | INSTRUCTION [10] | CHANGE SETTING [g g g g p p m m] |
| | NOTIFICATION [11] | CURRENT SETTING [g g g g p p m m] |
| 4 BITS OF TONE GROUPS IN SETTING INFORMATION INDICATE TONE GROUPS 0 TO 15. 2 BITS OF SET POSITION IN SETTING INFORMATION TO INDICATE: "00"=middle, "01"=Low, "10"=High, "11"=Reserved. 2 BITS OF MODULATION METHOD IN SETTING INFORMATION TO INDICATE: "00"=DQPSK, "01"=DBPSK, "10" = DBPSK + TIME DIVERSITY, "11"=Reserved. | | |

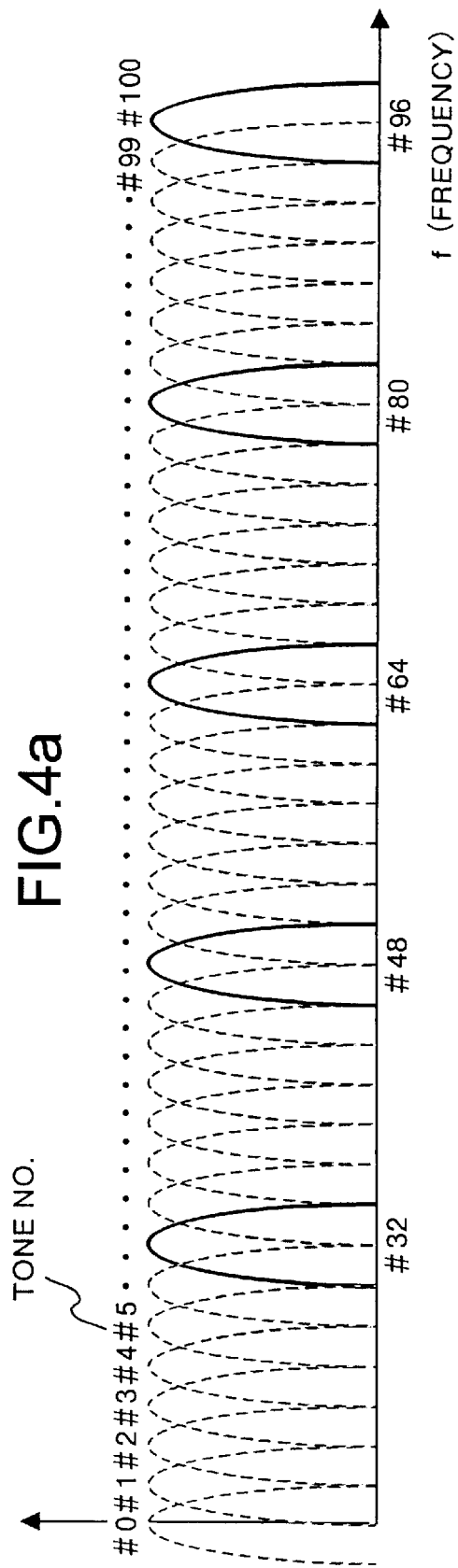

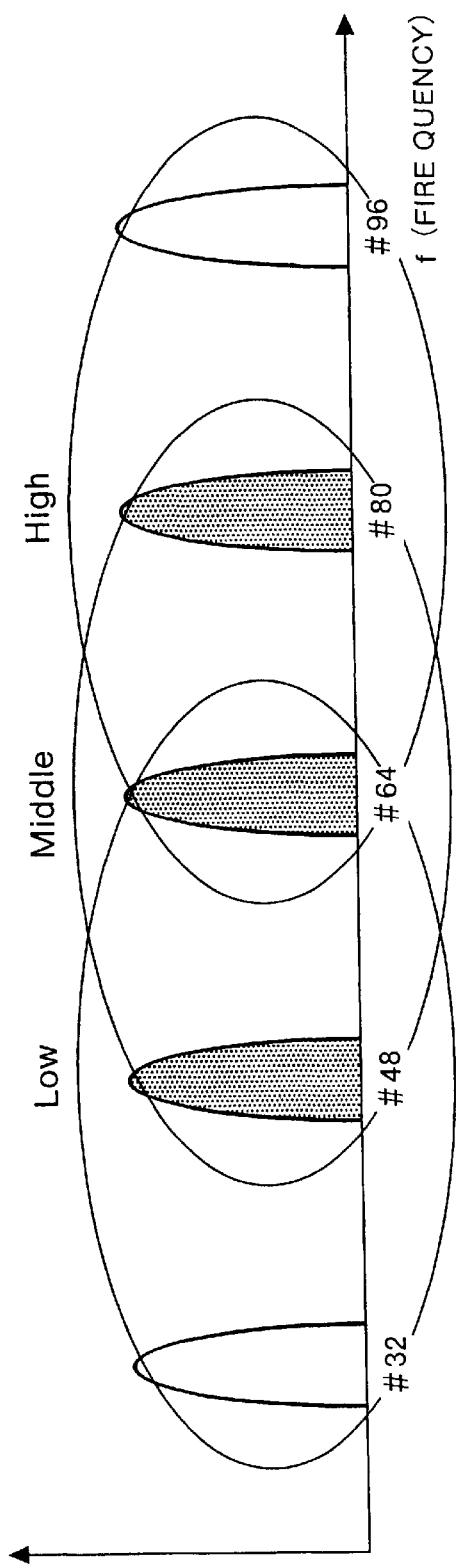

METHOD AND DEVICE FOR COMMUNICATION

This is a continuation of PCT/JP00/04289, filed Jun. 29, 2000.

TECHNICAL FIELD

The present invention relates to a communication method adopting a multi-carrier modulation-demodulation mode. More, particularly this invention relates to a communication method capable of realizing data communication using an existing power line by a DMT (Discrete Multi Tone) modulation-demodulation mode or an OFDM (Orthogonal Frequency Division Multiplex) modulation-demodulation mode, and to a communication device capable of realizing the communication method. It is noted, however, that the present invention should not be limited to a communication device for holding communication using a power line by the DMT modulation-demodulation mode. The present invention is applicable to all communication devices holding wire communication and radio communication through an ordinary communication line by a multi-carrier modulation-demodulation mode or a single-carrier modulation-demodulation mode.

BACKGROUND ART

A conventional communication method will be described hereinafter. In recent years, attention is being paid to "a power line modem" for holding communication using an existing power line without adding a new communication line so as to cut cost and to make an effective use of existing facilities. This power line modem conducts various processings including the control of electrical products inside or outside of houses, in buildings, factories, shops and the like connected by a power line, data communication and the like by establishing a network.

As a power line modem of this type, one using an SS (Spread Spectrum) mode is currently proposed. This mode has disadvantageous if the mode is used. For example, since spectra are emitted to range all over a given band, it is difficult that this SS mode and other communication modes coexist. In this mode, transfer rate for a used band is low. Further, if an existing power line which is not mainly intended at data communication such as a power line modem stated above is used for data communication, various equipment connected to the line so as to feed power to the equipment become noise sources. Thus, measures against noise should be taken.

Considering these disadvantages and from the viewpoint of high noise resistance, communication methods adopting a multi-carrier communication mode capable of holding communication wherein the same data is put on a plurality of frequency bands and communication using frequency bands less influenced by noise, are gradually proposed. In this multi-carrier communication mode, to-be-transmitted information data is divided and subjected to a primary modulation such as frequency conversion at a transmission (modulation) side and then a secondary modulation using IFFT (inverse fast Fourier transformation), i.e., multi-carrier modulation is conducted, thereby spreading the information data which has been subjected to the primary modulation to multiple carriers. A reception (or demodulation) side which has received data on the respective tones which data spread to the multiple carriers, performs an opposite processing to that of the transmission side, thereby demodulating the received data to original information data.

According to the communication method using the conventional multi-carrier communication mode as described above, the modulation mode for the primary modulation cannot be selectively changed. Due to this, in a communication environment in which noise has great influence, communication quality is enhanced by putting the same data on a plurality of carriers or moving tones. For example, if the influence of noise is widespread, these measures cannot disadvantageously suppress the influence of noise and communication quality equal to or higher than a certain level cannot be disadvantageously maintained.

In the environments of power line communication, in-vehicle communication by means of a navigator equipment, a computer, an ITS communication device or other electronic equipment installed to an automobile or the like and in-train communication for electric railcars and the like, the level of noise from the other equipment such as inverter noise is high, wide spread and changeable. As a result, it is quite difficult to maintain communication quality equal to or higher than a certain level. Thus, anti-noise measures other than the above-stated measures are further demanded.

It is an object of the present invention to provide a communication method capable of constantly maintaining high level, fixed communication quality without deteriorating characteristics even in communication environments greatly influenced by noise, and a communication device capable of realizing the communication method.

DISCLOSURE OF THE INVENTION

The communication method according to one aspect of this invention adopts a multi-carrier modulation-demodulation mode as a communication mode for data communication to be held among a plurality of communication devices connected to a transmission line and selects tones less influenced by noise and thereby operating to maintain fixed communication quality. The communication method comprises a first tone set movement step of monitoring the transmission line while the communication is held in a steady state, and judging that the communication quality cannot be maintained if there are no tones securing a specific standard, and moving a tone set by a predetermined method; a second tone set movement step of judging that the certain communication quality can be maintained and not moving the tone set if the number of tones securing the specific standard is equal to or higher than a predetermined number, and moving the tone set by the predetermined method if the number of the tones securing the specific standard is less than the predetermined number and it is judged that the communication quality can be maintained by moving the tone set in a same tone group; and a tone group movement step of moving the tone group by a predetermined method if it is judged that the communication quality cannot be maintained even by moving the tone set in the same tone group.

The above-mentioned communication method preferably further comprises a change step of recognizing a present state by monitoring a fixed tone set to which a position of a tone set currently used for communication is written, at a time of turning on power, and changing the tone set to the present state; and a frame transmission step of transmitting a frame using a tone set which has been set during initialization and waiting for a response from other communication devices if the fixed tone set cannot be received.

The above-mentioned communication method preferably further comprises a primary modulation mode selection step of selecting one of primary modulation modes having different noise resistances based on a predetermined standard if it is judged that the communication quality cannot be maintained even by making the primary modulation modes having different noise resistances selectable, executing movement of the tone set in the same tone group and executing movement of the tone group.

The above-mentioned communication method preferably further comprises a change step of recognizing a present state by monitoring a fixed tone set to which a position of a tone set currently used for communication and a primary modulation mode are written, at a time of turning on power, and changing the tone set to the present state; and a frame transmission step of transmitting a frame using a tone set which has been set during initialization and waiting for a response from other communication devices if the fixed tone set cannot be received.

In the above-mentioned communication method, in the primary modulation mode selection step, a DQPSK mode, a DBPSK mode and a BPSK+time diversity mode are selected as the primary modulation mode in this order.

In the above-mentioned communication method, in the fist tone set movement step, the position of the tone set in the same tone group is gradually moved from either a low frequency side or a high frequency side.

In the above-mentioned communication method, in the second tone set movement step, the position of the tone set is moved so that a good tone is located at a center based on a result of checking whether the specific standard can be secured.

In the above-mentioned communication method, in the tone group movement step, the tone group is moved in an order of tone group numbers.

In the above-mentioned communication method, characterized in that if a frame is received from a newly connected communication device, information on a tone set currently used for communication is put on a fixed tone set and transmitted.

The communication device according to one aspect of this invention adopts a multi-carrier modulation-demodulation mode as a communication mode for data communication to be held among a plurality of communication devices connected to a transmission line and selects tones less influenced by noise and to thereby maintain fixed communication quality. Furthermore, the transmission line is monitored while the communication is held in a steady state, it is judged that the communication quality cannot be maintained if there are no tones securing a specific standard, and a tone set is moved by a predetermined method; it is judged that the certain communication quality can be maintained and the tone set is not moved if the number of tones securing the specific standard is equal to or higher than a predetermined number, and the tone set is moved by the predetermined method if the number of the tones securing the specific standard is less than the predetermined number and it is judged that the communication quality can be maintained by moving the tone set in a same tone group; and the tone group is moved by a predetermined method if it is judged that the communication quality cannot be maintained even by moving the tone set in the same tone group.

In the above-mentioned communication device, a present state is recognized by monitoring a fixed tone set to which a position of a tone set currently used for communication is written at a time of turning on power, and the tone set is changed to the present state; and a frame is transmitted using a tone set which has been set during initialization and a response from other communication devices is awaited if the fixed tone set cannot be received.

In the above-mentioned communication device, one of primary modulation modes having different noise resistances is selected based on a predetermined standard if it is judged that the communication quality cannot be maintained even by making the primary modulation modes having different noise resistances selectable, executing movement of the tone set in the same tone group and movement of the tone group.

In the above-mentioned communication device, a present state is recognized by monitoring a fixed tone set to which a position of a tone set currently used for communication and a primary modulation mode are written, at a time of turning on power, and the tone set is changed to the present state; and a frame is transmitted using a tone set which has been set during initialization and a response from other communication devices is awaited if the fixed tone set cannot be received.

BRIEF DESCRIPTION OF THE DRAWINGS

FIG. 2 is a block diagram showing the constitution of a frame generated in a framing processing in a framing circuit 1 and the constitution of a POC field in the frame;

FIG. 3 is a view showing a POC modulation mode field and the contents of control commands;

FIG. 4 is a view showing the definition of tone groups used by the communication device for data communication;

FIG. 5 is a view showing the definition of a tone set in the tone group;

BEST MODE FOR CARRYING OUT THE INVENTION

Preferred embodiments of a communication method and a communication device according to the present invention will be described hereinafter in detail based on the drawings. It is noted that the present invention should not be limited to these embodiments.

The communication device according to the present invention actively detects tone having a high S/N ratio (Signal to Noise Ratio) so as to constantly maintain a high rate, that is, so that the S/N ratio is equal to or higher than a predetermined threshold value, makes primary modulation modes having different noise resistances selectable and selects one of the primary modulation modes according to the S/N ratio of a received signal, thereby maintaining higher level, fixed communication quality.

Figure 1:
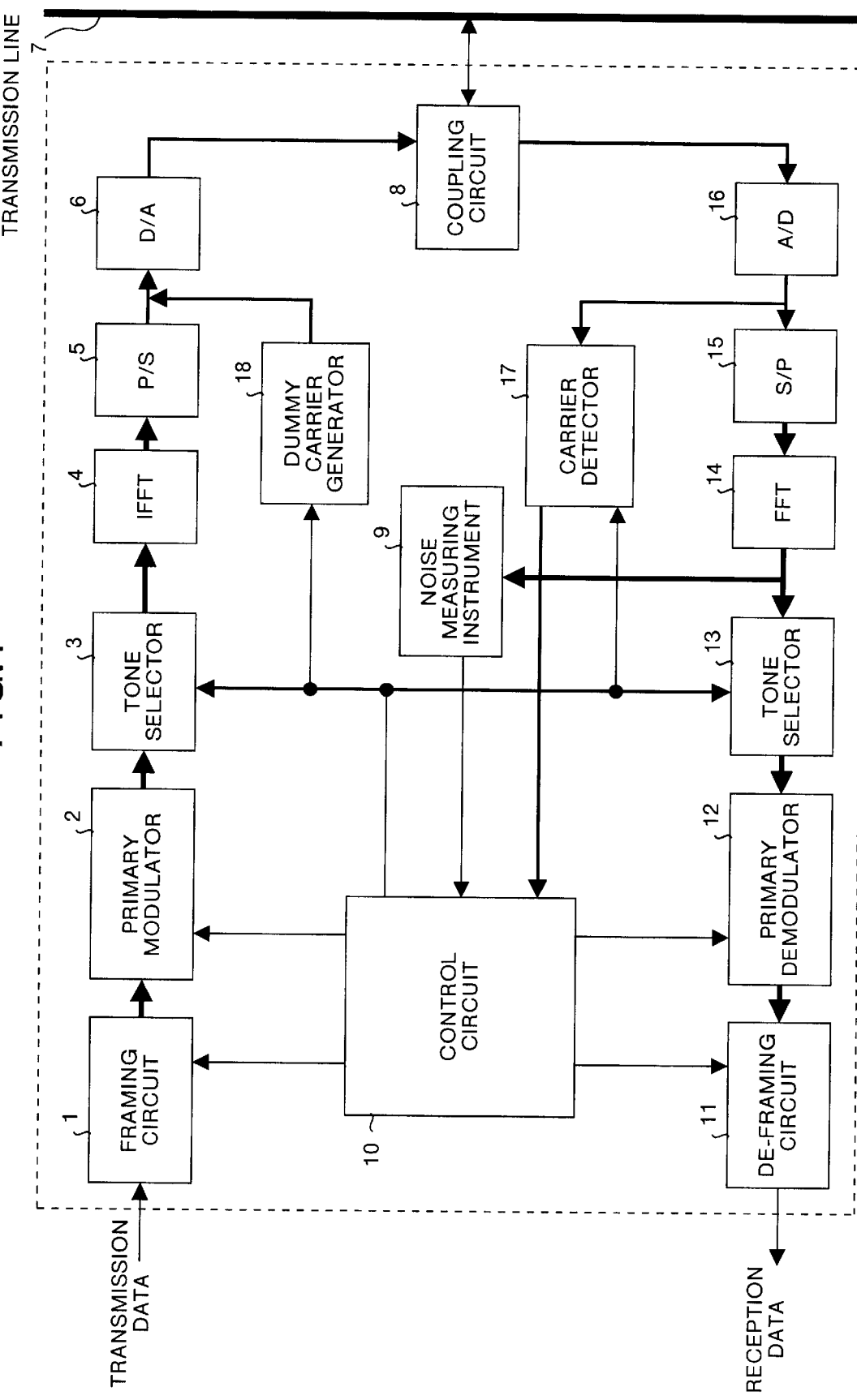
FIG. 1 is a block diagram showing the constitution of a communication device according to the present invention.

FIG. 1 is a block diagram showing the constitution of the communication device according to the present invention. In this embodiment and the following embodiments, an explanation will be given about a power line modem for holding data communication using an existing power line as a concrete example. The communication device according to the present invention is not limited to the power line modem but the present invention is also applicable to all communication devices holding wire communication and radio communication through an ordinary communication line by means of a multi-carrier modulation-demodulation mode or a single-carrier modulation-demodulation mode. In addition, the meanings of a carrier and a tone used in the following description are the same.

In FIG. 1, reference character 1 denotes a framing circuit, reference character 2 denotes a primary modulator, 3 denotes a tone selector, reference character 4 denotes an inverse Fast Fourier Transform circuit (IFFT: Inverse Fast Fourier Transform), reference character 5 denotes a parallel/serial conversion circuit (P/S), and reference character 6 denotes a digital/analog conversion circuit (D/A). Furthermore, reference character 7 denotes a transmission line (or power line), and reference character 8 denotes a coupling circuit. Furthermore, reference character 9 denotes a noise measuring instrument and reference character 10 denotes a control circuit. Furthermore, reference character 11 denotes a de-framing circuit, reference character 12 denotes a primary demodulator, reference character 13 denotes a tone selector, reference character 14 denotes a Fast Fourier Transform circuit (FFT: Fast Fourier Transform), reference character 15 denotes a serial/parallel conversion circuit (S/P), and reference character 16 denotes an analog/digital conversion circuit (A/D). Furthermore, reference character 17 denotes a carrier detector, and reference character 18 denotes a dummy carrier generator. The framing circuit 1, the primary modulator 2, the tone selector 3, the IFFT 4, the P/S 5, the D/A 6 constitute a transmission system. On the other hand, the A/D 16, the S/P 15, the FFT 14, the tone selector 13, the primary demodulator 12 and the de-framing circuit 11 constitute a reception system.

In a system in which a plurality of communication devices each constituted as stated above are connected to a power line serving as a transmission line, the respective communication devices, for example, cooperate with one another, whereby it is ensured changing carriers and, after changing carriers, i.e., after moving tones, it is ensured that a communication device newly connected to the power line can follow up the tone movement and the change of the primary modulator.

Operation of the above-mentioned communication device will be described. The operation of the transmission system will be explained first. For example, if transmission data is inputted from a data processor (not shown) connected to the communication device (or power line modem), the framing circuit 1 conducts a framing processing shown in FIG. 2 to be described later and outputs a resultant frame to the primary modulator 2. The primary modulator 2 modulates the received frame according to a mode instructed by primary modulation/demodulation mode selection information from the control circuit 10, encodes the same frame to a plurality of tones in a multi-carrier modulation mode and then outputs a resultant signal to the tone selector 3. In this embodiment, it is assumed that the primary modulation/demodulation mode selection information instructed to conduct primary modulation in a DQPSK modulation mode is inputted by default. In addition, the primary modulator 2 encodes the same frame to five tones (to be referred to as "tone set" hereinafter) #32, #48, #48, #64, #80 and #96 as shown in FIG. 4 to be described later.

Thereafter, the tone selector 3 selects three tones #48, #68 and #80 from the tone set based on primary modulation mode change information from the control circuit 10, and outputs the selected tones to the IFFT 4. The IFFT 4 inversely Fourier-transforms the received three tones #48, #68 and #80, thereby converting frequency axis data into time axis data and outputting the converted data to the P/S 5.

The P/S 5 converts the parallel data outputted from the IFFT 4 into serial data, and then outputs the serial data to the D/A 6. Finally, the D/A 6 conducts digital/analog conversion to thereby convert the serial data into an analog signal, and transmits the analog signal to other communication devices (not shown) connected to the power line 7 through the coupling circuit 8 and the power line 7.

As a result, as shown in FIG. 5 to be described later, the same multi-carrier data put on the three tones away from one another at frequency intervals of 16 tones on the frequency axis, respectively, are outputted onto the power line 7. Because of the fact that three multi-carrier data at frequency intervals of 16 tones are transmitted, even if noise concentrates in a certain frequency band, a reception apparatus receiving the data can transmit data sufficiently resistible against noise compared with single-carrier power line communication by as much as the frequency intervals.

The operation of the reception system will be explained now. Since only one communication device is connected to the transmission line for the convenience of description, the constitution of the reception system shown in FIG. 1 will be described hereinafter. First, if multi-carrier data is transmitted from the transmission system as already described above, the reception system of the other communication device performs an opposite operation to that of the transmission system and demodulates the data. Namely, the reception system captures the three multi-carrier data transmitted from the transmission-side communication device. Then, the A/D 16 conducts analog/digital conversion to thereby convert the data into digital data, the S/P 15 converts the digital data converted from the serial data into parallel data, and outputs the parallel data to the FFT 14.

The FFT 14 Fourier-transforms the parallel data to thereby convert the multi-carrier data on the time axis into data on the frequency axis, and outputs the frequency axis data to the tone selector 13 and the noise measuring instrument 9. Then, the tone selector 13 selects the three tones #48, #64 and #80 designated by the control circuit 10, and outputs the selected tones to the primary demodulator 12. The primary demodulator 12 demodulates the same data with these three tones of #48, #64 and #80 according to a primary demodulation mode designated by the primary modulation/demodulation mode selection information from the control circuit 10.

Finally, the de-framing circuit 11 conducts a de-framing processing to the primarily demodulated data to thereby generate reception data, and outputs the reception data to an equipment (not shown) connected to the communication device. The de-framing processing is a processing opposite to the framing processing conducted by the framing circuit 1, for separating a preamble and a control code from the frame of the primarily modulated data and synthesizes only a data field, i.e., for restructuring the reception data in the form of the original transmission form.

FIG. 2 is a bock diagram showing the constitution of the frame generated in the framing processing conducted by the framing circuit 1 and the constitution of a POC (power Line Overhead Control) field in the frame. The frame shown in FIG. 2 consists of a preamble field which is the region of a signal for carrier detection and symbol synchronization, a synchronization code field which is the region of a fixed code which is preset, a FrameType (FT) field which is the region of a signal indicating the length of a data field, a HouseCode (HC) field which is the region of a house identification code, a POC field which is the region of control commands used on a physical layer, an R-S code field which is the region of an error correction code with respect to the FT, HC and POC fields, and the data field. This frame is generated in the framing circuit 1, modulated by the above-stated processing and then outputted to the transmission line 7.

The frame on the transmission line is received by all the communication devices connected to the transmission line. If the control circuit 10 of one of the communication devices identifies the HC-field to find that the HC field coincides with the HC of a house where the communication device is located, then the control circuit 10 judges that the data being transmitted on the transmission line 7 is addressed to the communication device and conducts error check/correction using the R-S (read Solomon) code to grasp the content of the data. If the HC field of the frame is not coincident with the HC field of the frame, the control circuit 10 does not operate.

The POC field consists of a two-bit communication mode field which sets communication rate, a two-bit modulation mode field which indicates a selectable modulation mode, a one-bit command field which indicates control commands, a two-bit sub-commands indicating the functions of the control commands, an 8-bit command argument which indicates setting information on the respective functions, and one extension bit. The POC is used, for example, to conduct processings including tone movement and modulation mode change. These control commands in the POC field are added, together with the data, to the frame by the framing processing and separated/extracted from the frame by the de-framing processing.

FIG. 3 shows the contents of the modulation mode field and the control commands in the POC shown in FIG. 2. In FIG. 3, only the fields related to this embodiment are shown. To be specific, if the modulation mode field is [00], DQPSK is selected as the primary modulation mode, if [01], DBPSK is selected, if [10], DBPSK+time diversity is selected (see FIG. 3(a)). A pseudo command of command [0] is one used when communication is held in a steady state. If the pseudo command is [0] and a sub-command thereof is NOP [00], it indicates a command meaning "NOP: no operation is performed". If tone movement or modulation mode change is not made, this command is usually inserted into the command field. If the command is [0] and a sub-command thereof is dummy [01], it indicates a command meaning that this frame is a dummy frame and that no data is present in the data field and positional information on tones which is now in use, i.e., positional information on active tones (see FIG. 3(b)). The 8-bit command argument corresponding to each sub-command makes a setting for a current tone set, i.e., sets a present tone group, a tone set position and a modulation mode.

Further, a communication setting change command of command [1] is one used when making tone movement and modulation mode change. For example, if the command is [1] and a sub-command thereof is instruction [10], it indicates a command for instructing tone movement or modulation mode change. If the command is [1] and a sub-command thereof is notification [11], it indicates a command, for example, for notifying a communication device newly connected to the transmission line 7 of a present state. The command argument corresponding to each sub-command makes a change setting/current setting, i.e., sets tone groups before and after change, the position of the tone set and a modulation mode. In the description which follows, an active tone set means a specific tone set (of three tones) in a specific tone group (of five tones) used for data communication. An active tone means one arbitrary tone among the three tones constituting the active tone set. A default tone set means a fixed tone set consisting of tones #48, #64 and #80. A default tone is one arbitrary tone among the three tones constituting the default tone set.

It is noted that the contents of control commands shown in FIG. 3(b) described above is based on the following. For example, if "active tone set (ATS) ≠ default ton set (DTS)", the ATS means NOP and the DTS means a dummy frame in ordinary operation (with the control command [0]). The ATS means instruction and the DTS means a dummy frame when a communication setting is changed (communication setting change [1]). The ATS means notification and the DTS means a dummy frame when a newly connected communication device is discovered. On the other hand, if "ATS=DTS", the ATS (–DTS) means NOP in ordinary operation (with control command [0]), and the ATS (=DTS) means instruction when a communication setting is changed (communication setting change [1]).

FIG. 4 shows the definition of a tone group used by the communication device shown in FIG. 1 for data communication. For example, in the communication device for power line communication, it is assumed that there are 80 (#17 to #96) tones at intervals of 4.3125 kHz as shown in FIG. 4(a). A group of five tones selected at intervals of 16 tones is defined as a tone group, and 16 tone groups (tone groups 0 to 15) starting at tone #17 to tone #32 as shown in FIG. 4(b).

FIG. 5 shows the definition of tone sets in the above-stated tone groups. It is defined, for example, that a set of continuous three tones among the five tones constituting an arbitrary tone group is a tone set. Namely, the set position of a tone set consisting of three continuous tones at a low frequency side in each tone group is Low position, that of a tone set consisting of three continuous tones at a high frequency side is High position, that of a central tone set is Middle position. Therefore, data communication is conducted using a tone set designated at a specific set position in a specific tone group.

Figure 6:
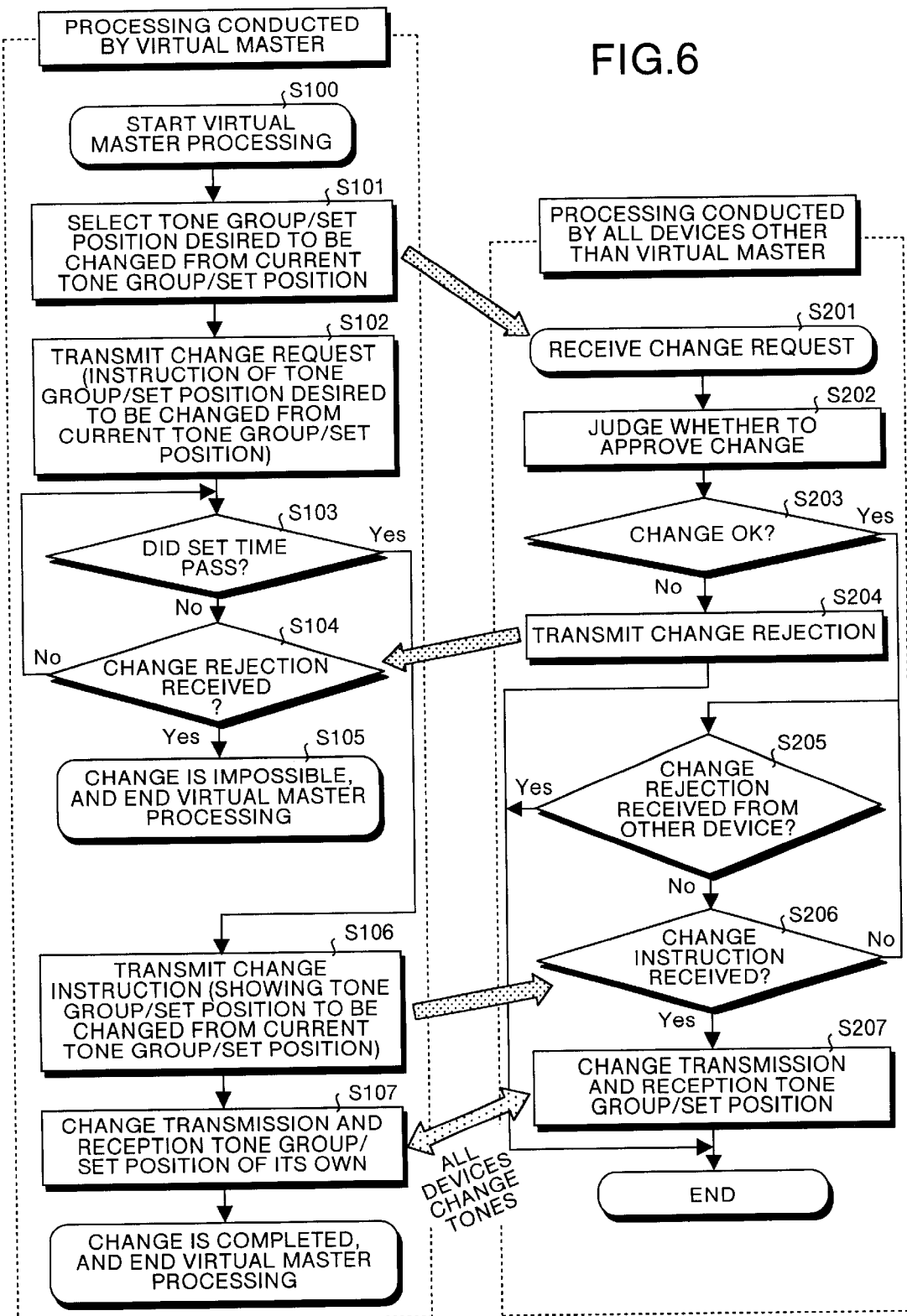
FIG. 6 is a flow chart showing a tone movement method.

Now, an explanation will be given about an ordinary tone movement method and a modulation mode change method in the communication device shown in FIG. 1 with reference to the drawings. FIG. 6 is a flow chart showing the ordinary tone movement method. First, if the noise measuring instrument 9 of a certain communication device (or power line modem) connected to the transmission line 7 measures noise and judges that it is difficult to continue communication with a current tone group and a current set position, then the communication device becomes a virtual master in a tone movement processing and starts a virtual master processing (in a step S100). The control circuit 10 of this virtual master selects a tone group to which the current tone group is desired to be moved and a set position to which the current set position is desired to be moved (in a step S101), and outputs a tone change request showing the desired tone group and the desired set position onto the power line 7 (in a step S102).

Thereafter, the virtual master judges whether or not the master receives information indicating the rejection of change from a communication device other than the virtual master within a preset time (in a step S103 and "No" in a step 104).

On the other hand, all the communication devices except for the virtual master which received the tone change request from the virtual master (in a step S201) judge whether to approve the change of the tone group and the set position, respectively (in a step S202). It is noted that each of the communication devices senses carriers and receive all communication data flowing on the transmission line at a physical layer level regardless of whether the data transmitted on the power line 7 is addressed to the communication device. If the data is addressed to a certain communication device, for example, the communication device passes only the data field thereof to superordinate layers and if not, the communication device does not operate at all.

If a certain communication device judges that the change of the tone group and the set position is rejected ("No" in a step S203), the communication device generates information indicating the rejection of tone change and transmits the information to the virtual master (in a step S204). If judging that the change of the tone group and the set position is not rejected ("Yes" in the step S203), the communication device moves to a processing in a step S205 to be described later.

For example, if the virtual master receives information indicating the rejection of tone change within a set time ("Yes" in the step S104), it means that at least one communication device other than the virtual master rejects the change of the tone group and the set position. In response, the virtual master gives up changing the tone group and the set position and finishes the virtual mater processing (in a step S105). On the other hand, if the virtual master does not receive the information indicating the rejection of tone change within the set time ("No" in the step S104, "Yes" in the step S103), it means that all the communication devices except for the virtual master approve to change the tone group and the set position. Therefore, the virtual mater generates a tone change instruction showing a tone group and a set position to which the current tone group and set position are to changed, and transmits the instruction to all the communication devices except for the virtual mater (in a step S106). The virtual mater then changes the tone group and the set position of itself to the tone group and the set position selected in the step S101 (in a step S107).

Further, if a certain communication device other than the virtual mater judges that the device does not reject the change of the tone group and the set position in the processing of the step S203 ("Yes" in the step S203), the communication device judges whether to receive the rejection of change from the other communication devices except for the virtual master (in a step S205). If the certain communication device receives the rejection ("Yes" in the step S205), the communication device finishes a series of processings without making a tone change. If not receiving the rejection ("No" in the step S205), the communication device waits for a change instruction from the virtual master ("No" in a step S206). When receiving the change instruction ("Yes" in the step 206), the communication device changes the tone group and the set position of itself to the tone group and the set position in accordance with the change instruction (in a step S207).

In case of a communication device newly connected to the transmission line, since the communication device does not recognize the tone group and the set position currently used for communication, the communication device promptly searches for the tone group and the set position used for communication by using the default tone set and makes a tone movement based on the search result. Further, a status in which the tone movement is necessary usually means that a communication state is deteriorated by noise and that some communication devices may highly likely not be able to receive an instruction or the like by a command issued only once. In this case, therefore, assuming that a change request or the rejection of change cannot be received by the command issued once, the transmission of the change request or the rejection of change is conducted a plurality of times.

Figure 7:
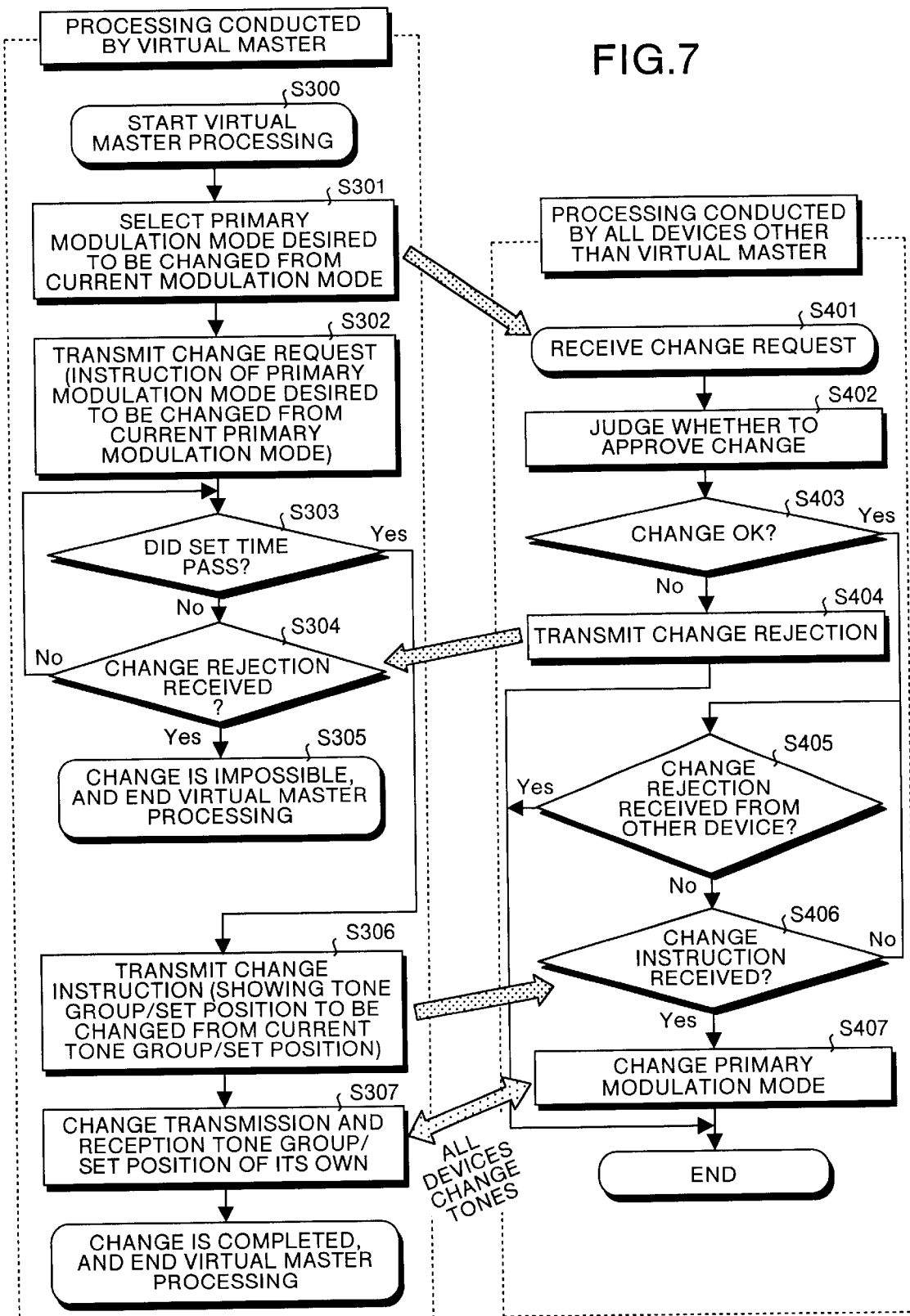
FIG. 7 is a flow chart showing an ordinary modulation mode change method.

FIG. 7 is a flow chart showing an ordinary modulation mode change method. First, if the noise measuring instrument 9 of a certain communication device connected to the transmission line 7 measures noise and judges that it is difficult to continue communication with a current tone group and a current set position, then the communication device becomes a virtual master in modulation mode change processing and starts a virtual master processing (in a step S300). The control circuit of the virtual master selects a primary modulation mode to which a current modulation mode is desired to be changed (in a step S301), and outputs a modulation mode change request indicating the desired primary modulation mode to the power line 7 (in a step 302).

Then, the virtual master judges whether or not the virtual master receives information indicating the rejection of change from communication devices other than the virtual mater (in a step S303 and "NO" in a step S304).

On the other hand, all the communication devices except for the virtual master which received the modulation mode change request from the virtual master (in a step S401) judge whether to approve the change of the primary modulation mode (in a step S402) If judging that the change of the primary modulation mode is rejected ("No" in a step S403), each communication device generates information indicating the rejection of modulation mode change, and transmits the information to the virtual master (in a step S404). If judging that the change of the primary modulation mode is not rejected ("Yes" in the step S403), the communication device moves to a processing in a step S405 to be described later.

For example, if the virtual master receives information indicating the rejection of modulation mode change within a set time ("Yes" in the step S304), it means that at least one communication device other than the virtual master rejects the change of the primary modulation mode. In response, the virtual master gives up changing the primary modulation mode and finishes the virtual master processing (in a step S305). On the other hand, if the virtual master does not receive the information indicating the rejection of modulation mode change within the set time ("No" in the step S304 and "YES" in the step S303), then it means that all the communication devices except for the virtual master approve to change the primary modulation mode. Therefore, the virtual master generates a modulation mode change instruction indicating a modulation mode to which the current modulation mode is to be changed, and transmits the instruction to all the communication devices except for the virtual master (in a step S306) Then, the virtual master change the primary modulation mode of its own to the modulation mode selected in the step S301 (in a step S307).

Further, if a certain communication device other than the virtual master judges that the change of the primary modulation mode is not rejected in the step S403 ("Yes" in the step S403), then the communication device other than the virtual master judges whether to receive the rejection of the modulation mode change from the other communication devices except for the virtual master (in a step S405). If judging not to receive the rejection ("No" in the step S405), the communication device waits for the modulation mode change instruction from the virtual master ("No" in a step S406). When receiving the modulation mode change instruction ("Yes" in the step S406), the communication device changes the primary modulation mode of its own to the modulation mode in accordance with the instruction (in a step S407).

In case of a communication device newly connected to the transmission line, since the communication device does not recognize the primary modulation mode currently used for communication, the communication device promptly searches for the primary modulation mode currently used for communication and changes the modulation mode of its own based on the search result. Further, a status in which the primary modulation change is necessary usually means that a communication state is deteriorated by noise and that some communication devices may highly likely not be able to receive an instruction or the like by a command issued only once. In this case, therefore, assuming that a change request or the rejection of change cannot be received by the command issued once, the transmission of the change request or the rejection of change is conducted a plurality of times.

However, in the tone movement and the modulation mode change shown in FIG. 6 and FIG. 7, even if a certain communication device judges that change is to be made, all the communication devices connected to the transmission line 7 can output the rejection of change. It is, therefore, possible to easily interrupt the tone movement and the modulation mode change. Thus, even if transmission rate is slightly decreased, all the communication devices are controlled not to make the tone movement and the modulation mode change in response to the rejection of change from the certain communication device.

Considering this, in this embodiment, the communication device actively detects tones having a high S/N ratio so as to constantly maintain high transmission rate, i.e., so that the S/N ratio can be maintained to be equal to or higher than a predetermined threshold value. Besides, the communication device moves current tones to the detected tones without waiting for the rejection of change from the other communication device and constantly holds communication with appropriate tones, thereby maintaining high level, fixed communication quality.

Figure 8:
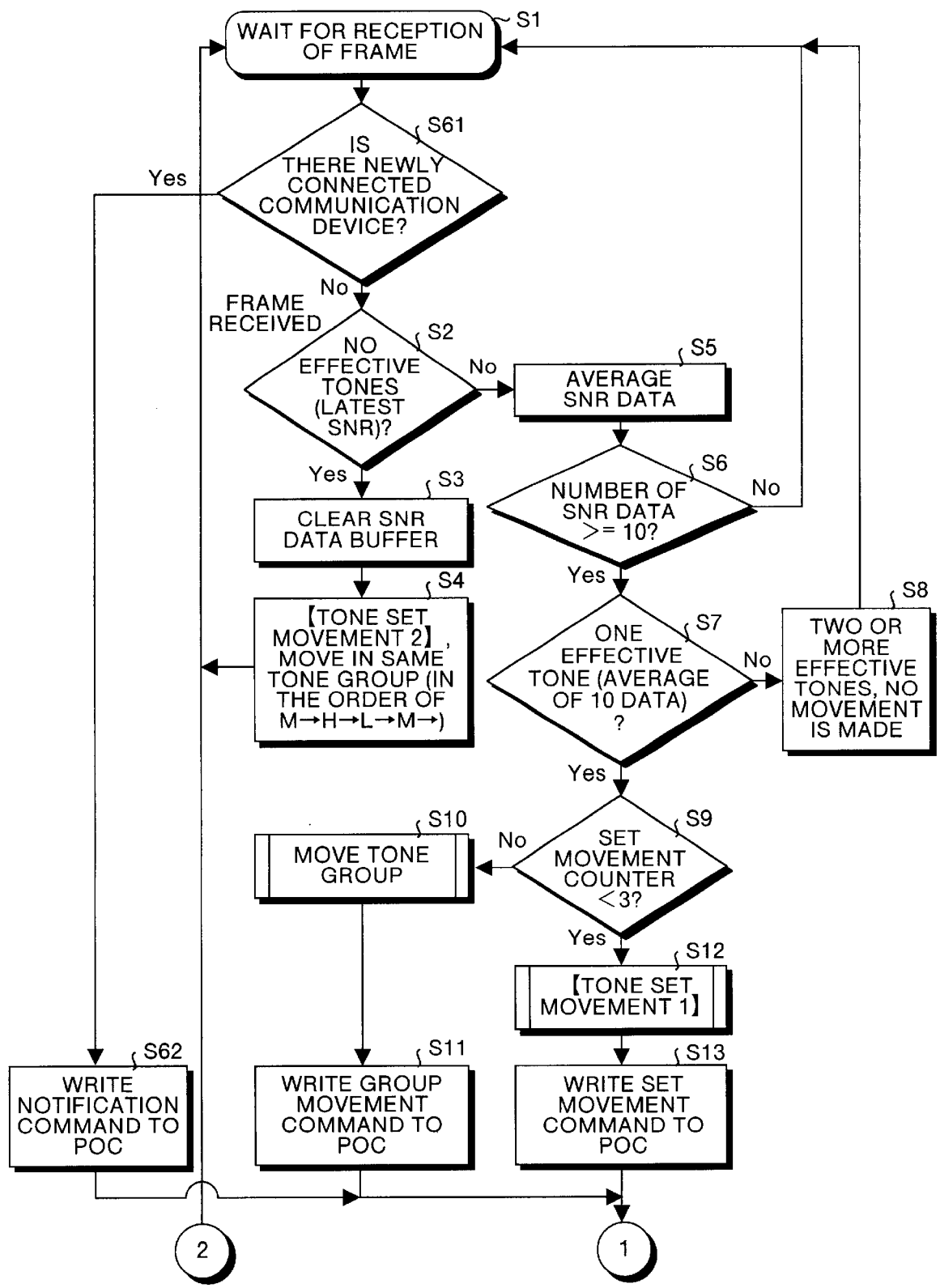
FIG. 8 is a flow chart (Example 1-1) in a first embodiment of a communication method according to the present invention.
Figure 9:
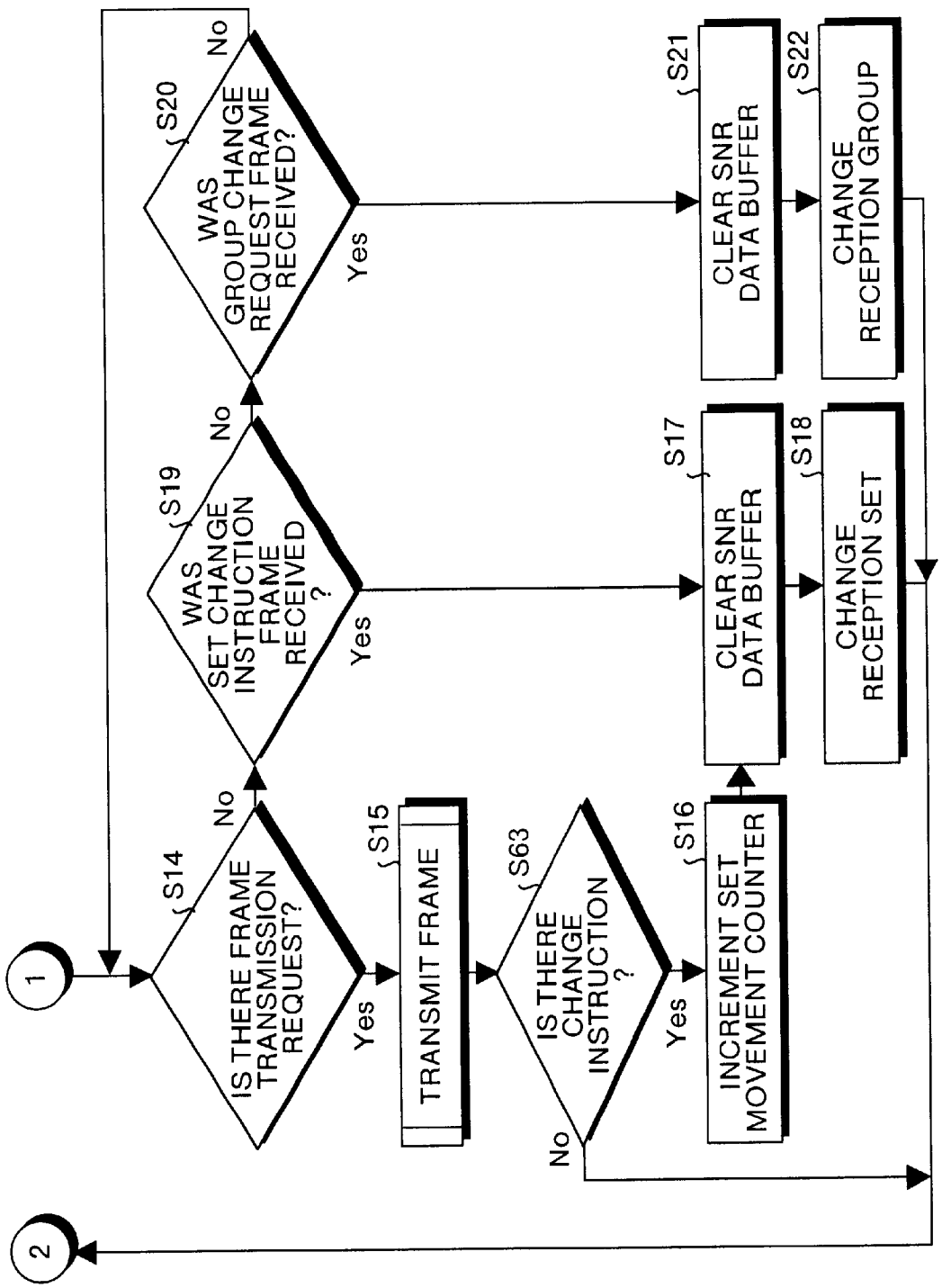
FIG. 9 is a flow chart (Example 1-2) in the first embodiment of the communication method according to the present invention.

FIG. 8 and FIG. 9 are flow charts of the first embodiment of a communication method according to the present invention. Here, an explanation will be given about a case of moving tones, i.e., changing a tone group and a set position while communication is held in a steady state. For example, if data communication is held in a steady state, the control circuit 10 of each of all the communication devices connected to the transmission line 7 monitors the transmission line 7 (in a step S1 in FIG. 8). At this moment, the control circuit 10 judges whether or not there is a communication device newly connected to the transmission line 7 (in a step S61). If there is a newly connected communication device ("Yes" in the step S61), the control circuit 10 writes a notification command to the POC field of a frame (in a step S62). If there is a frame transmission request, the control circuit 10 transmits the frame ("Yes" in a step S14 in FIG. 9 and in a step S15) and responds to the newly connected communication device. By doing so, it is possible to notify the newly connected control device which cannot follow up the other communication devices which are holding communication in a steady state of the position of an active tone set. In this case, a change instruction command is not transmitted ("No" in a step S63), processings in a step S16 and the following are not conducted.

If it is judged in the step S61 in FIG. 8 that there is no newly connected communication device ("No" in the step S61), the control circuit 10 checks whether there is effective tones (in a step S2 in FIG. 8), i.e., whether three active tones maintain an S/N ratio (BER) equal to or higher than a specific threshold value. For example, if the current three active tones cannot maintain the specific threshold value ("Yes" in the step S2), the control circuit 10 judges that communication quality cannot be maintained and the communication device in which the control circuit 10 is provided clears an internal SNR data buffer (not shown) used to measure the S/N ratio (in a step S3) and then makes a tone set movement (in a step S4).

In this case, a set position in the same tone group is moved and the tone set is moved in the order of, for example, Middle position→High position→Low position→Middle position, and repeats the steps S1 to S4 until effective tones are detected in the processing of the step S2 ("No" in the step S2). The order of movement should not be limited to the above and the set position may be moved in a frequency ascending order.

If effective tones are detected in the step S2 ("No" in the step S2), the control circuit 10 averages SNR data for each of the three tones in the tone set during communication (in a step S5). In this state, the control circuit 10 judges whether SNR data of 10 frames have been averaged (in a step S6). If the SNR data of 10 frames have not been averaged yet ("No" in the step S6), the processings in the steps S1, S2, S5 and S6 are repeatedly executed until the SNR data of 10 frames have been averaged. If the number of frames becomes 10 ("Yes" in the step S6), the control circuit 10 checks the number of effective tones based on the average value of the SNR data for each tone, i.e., by comparison of the average value with a predetermined threshold value (average value) (in a step S7). In this embodiment, the average value of the number of the SNR data is 10 frames; however, the average value should not be limited to 10.

For example, if there are two or more effective tones ("No" in the step S7 and in a step S8), the control circuit 10 judges that a certain degree of an S/N ratio is secured and tone movement is not, therefore, necessary, and no tone movement is made, and the communication device turns into a frame wait state again (in a step S1). If the number of effective tones is 1 ("Yes" in the step S7), the control circuit 10 checks an internal set movement counter (not shown) (in a step S9).

If it is found that a counter value is 2 or lower as a result of checking ("Yes" in the step S9), the control device determines a good tone set while referring to the average value of SNR data (in a step S12) and then writes a tone set movement command (communication setting change—instruction command in FIG. 3(b)) to the POC field (in a step S13). The judgment result will be described later. If it is found that the counter value is 3 as a result of checking ("No" in the step S9), the control circuit 10 judges that there is no tone set, in the tone group with which communication is currently held, capable of maintaining communication quality, determines a good tone group while referring to the average value of the SNR data (in a step S10) and then writes a tone group movement command (communication setting change-instruction command in FIG. 3(b)) to the POC field (in a step S11).

In this state (in which the movement command to move either the tone set or the tone group is written to the POC field), the control circuit 10 judges whether or not a frame transmission request is issued to the communication device in which the control circuit 10 is provided (whether to transmit user data). If there is a frame transmission request ("Yes" in a step S14 in FIG. 9), the communication device transmits a preset POC (change instruction) together with an ordinary frame (in a step S15 and "Yes" in a step S63) and further executes the increment of the set movement counter (in a step S16) and the clearing of the SNR data buffer (in a step S17). After executing the tone movement (in a step S18), the communication device returns to a frame reception wait state (in the step S1 in FIG. 8). In this embodiment, therefore, a certain communication device does not intend to transmit user data ("No" in the step S14 in FIG. 9), no tone movement is made. In this embodiment, only if a frame transmission request is issued to the certain communication device, the communication device transmits a frame including a POC field to avoid unnecessary transmission.

In the above-described state, if the certain communication device receives a set change instruction frame from the other communication device before a frame transmission request to the communication device occurs ("No" in the step S14 and "Yes" in the step S19), then the communication device clears the SNR data buffer (in the step S17), executes a tone movement (in the step S18) and then returns to the frame reception wait state (in the step S1 in FIG. 8). Further, the communication device receives a group change request from the other communication device before a frame transmission frame transmission request to the communication device occurs ("No" in the step S14, "No" in the step S19 and "Yes" in the step S20 in FIG. 9), then the communication device executes the clearing of the SNR data buffer (in a step S21), executes a tone movement (in a step S22) and then returns to the frame reception wait state (in the step S1 in FIG. 8).

The communication method shown in FIG. 8 may be referred to as a method of a change instruction response type for moving a tone group and a set position only when there is a change instruction by active tones, and a transmission request wait type for responding to a newly connected communication device only when there is a frame transmission request.

Next, the tone set movement method in the processing in the step S12 stated above will be briefly described. The tone set is moved to, for example, a tone set having a good SNR numerical value while referring to the average value of the SNR data. If the average value of the SNR data is the same, for example, the tone set is moved to a high frequency side. To be specific, if the current tone set is at the Middle position and the S/N ratio measurement result is [1], then the control circuit 10** judges that the S/N ratio of high frequency tones is good and moves the current tone set to the High position. It is noted that symbol * represents an ineffective tone and symbol 1 represents an effective tone. If the current tone set is at the Middle position and the S/N ratio measurement result is [*1*], then the control circuit 10 moves the current tone set to a position having a good S/N ratio. If the current tone set is at the Middle position and the S/N ratio measurement result is [1], then the control circuit 10** judges that the S/N ratio of low frequency tones is good and moves the current tone set to the Low position.

Base on the same standard, if the current tone set is, for example, at the High position and the S/N ratio measurement result is [1], then the control circuit 10** does not move the tone set in this tone group. Further, if the current tone set is at the High position and the S/N ratio measurement result is [*1*], then the control circuit 10 moves the current tone set to a position having a good S/N ratio. Moreover, if the current tone set is at the High position and the S/N ratio measurement result is [1], then the control circuit 10** judges that the S/N ratio of low frequency tones is good and moves the current tone set to the Middle position.

Based on the same standard, if the current tone set is, for example, at the Low position and the S/N ratio measurement result is [1], then the control circuit 10** judges that the S/N ratio of high frequency tones is good and moves the current tone set to the Middle position. Further, if the current tone set is at the Low position and the S/N ratio measurement result is [*1*], then the control circuit 10 moves the tone set to a position having a good S/N ratio. Moreover, if the current tone set is at the Low position and the S/N ratio measurement result is [1], then the control circuit 10** does not move the tone set in this tone group.

By doing so, in this embodiment, it is possible to easily move the tone set to an appropriate set position and to, therefore, constantly hold data communication under optimum conditions.

As can be seen from the above, in this embodiment, all of the communication devices connected to the transmission line 7 cannot output the rejection of change, tones having a high S/N ratio are actively detected so that high transmission rate can be constantly maintained, i.e., the S/N ratio is maintained to be equal to or higher than the predetermined threshold value, and tone movement is made soon after the tones are detected, thereby constantly holding communication with optimum tones. Thus, even in the communication environment greatly influenced by noise, it is possible to constantly maintain high level, fixed communication quality without deteriorating characteristics.

Figure 10:
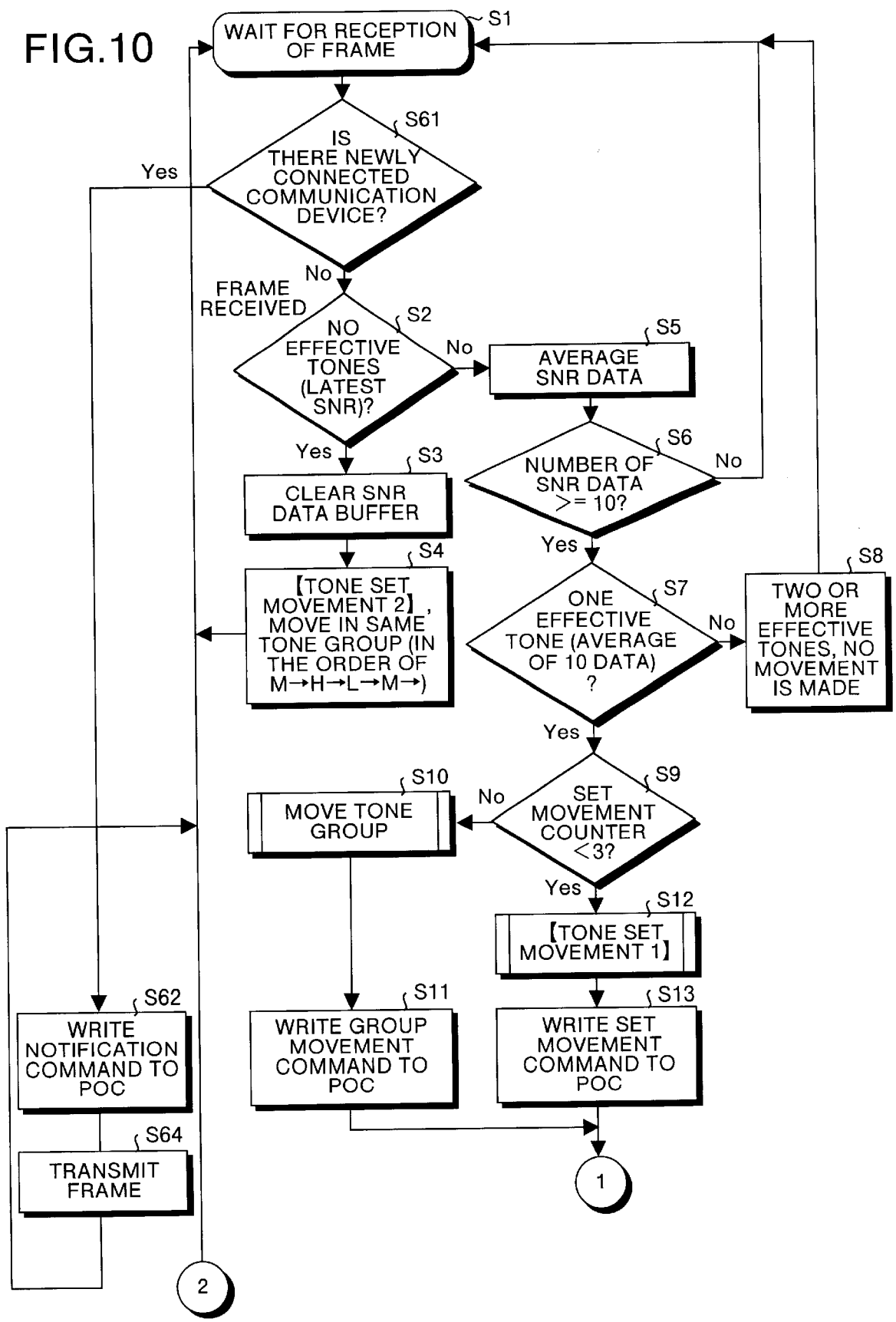
FIG. 10 is a flow chart (Example 2-1) in the first embodiment of the communication method according to the present invention.
Figure 11:
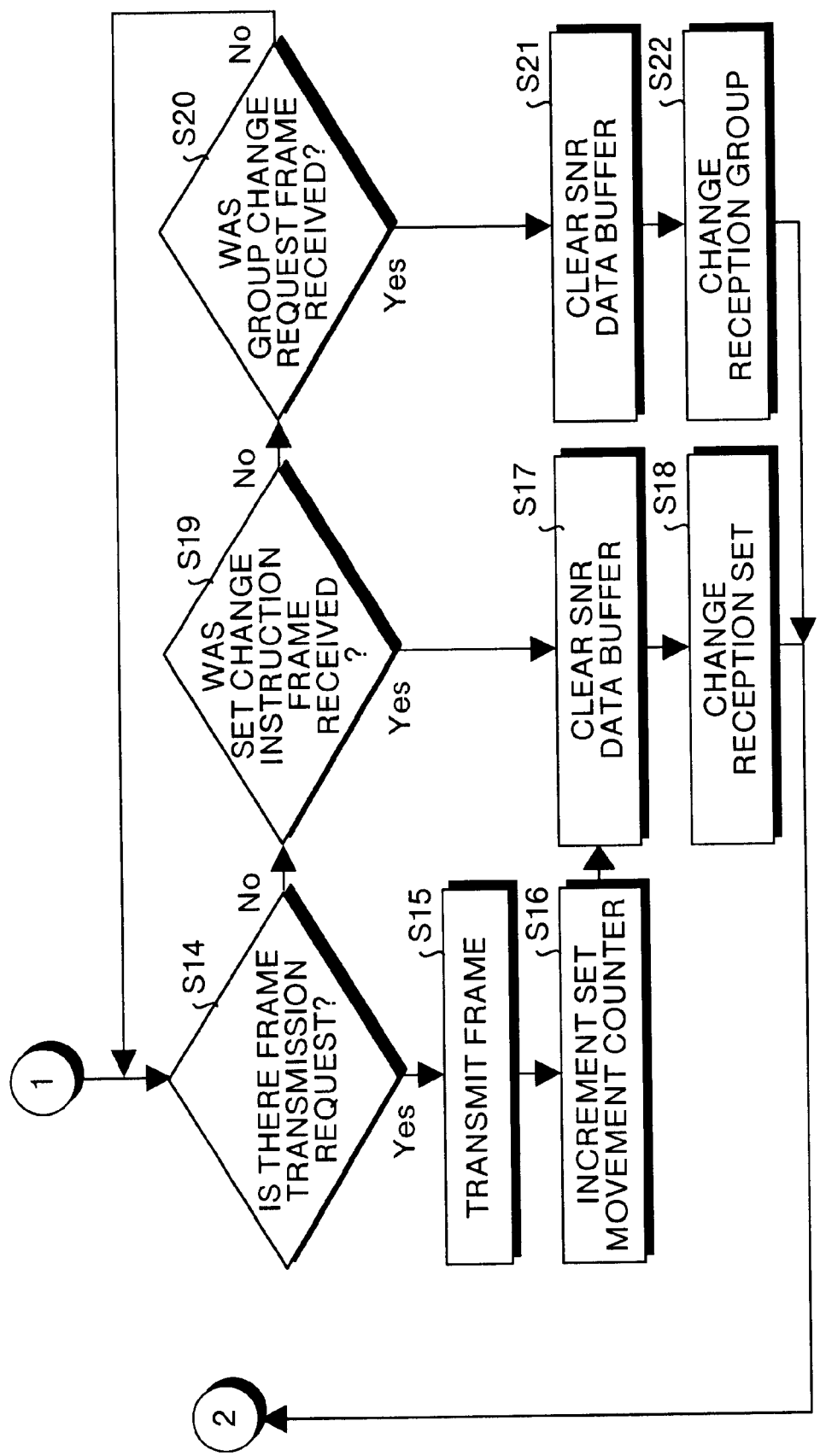
FIG. 11 is a flow chart (Example 2-2) in the first embodiment of the communication method according to the present invention.

FIG. 10 and FIG. 11 show a communication method for changing a tone group and a set position while communication is held in a steady state as in the case of FIG. 8 and FIG. 9. This method is of a change instruction response type for moving the tone group and the set position only when there is a change instruction with active tones and a prompt response type for responding to a newly connected communication device even if there is no frame transmission request (Example 2).

For example, if communication is held in a steady state FIG. 10 and FIG. 11, the control circuit 10 of each of all the communication devices connected to the transmission line 7 monitors the transmission line 7 (in a step S1 in FIG. 10). At this moment, the control circuit 10 judges whether or not there is a communication device newly connected to the transmission line 7 (in a step S61). If there is a newly connected communication device ("Yes" in the step S61), then the control circuit 10 writes a notification command to the POC field of a frame (in a step S62), transmits the frame to the other communication devices (in a step S64) and responds to the newly connected communication device. The remaining steps are the same as those shown in FIG. 8 and FIG. 9, which description will not be given herein.

Figure 12:
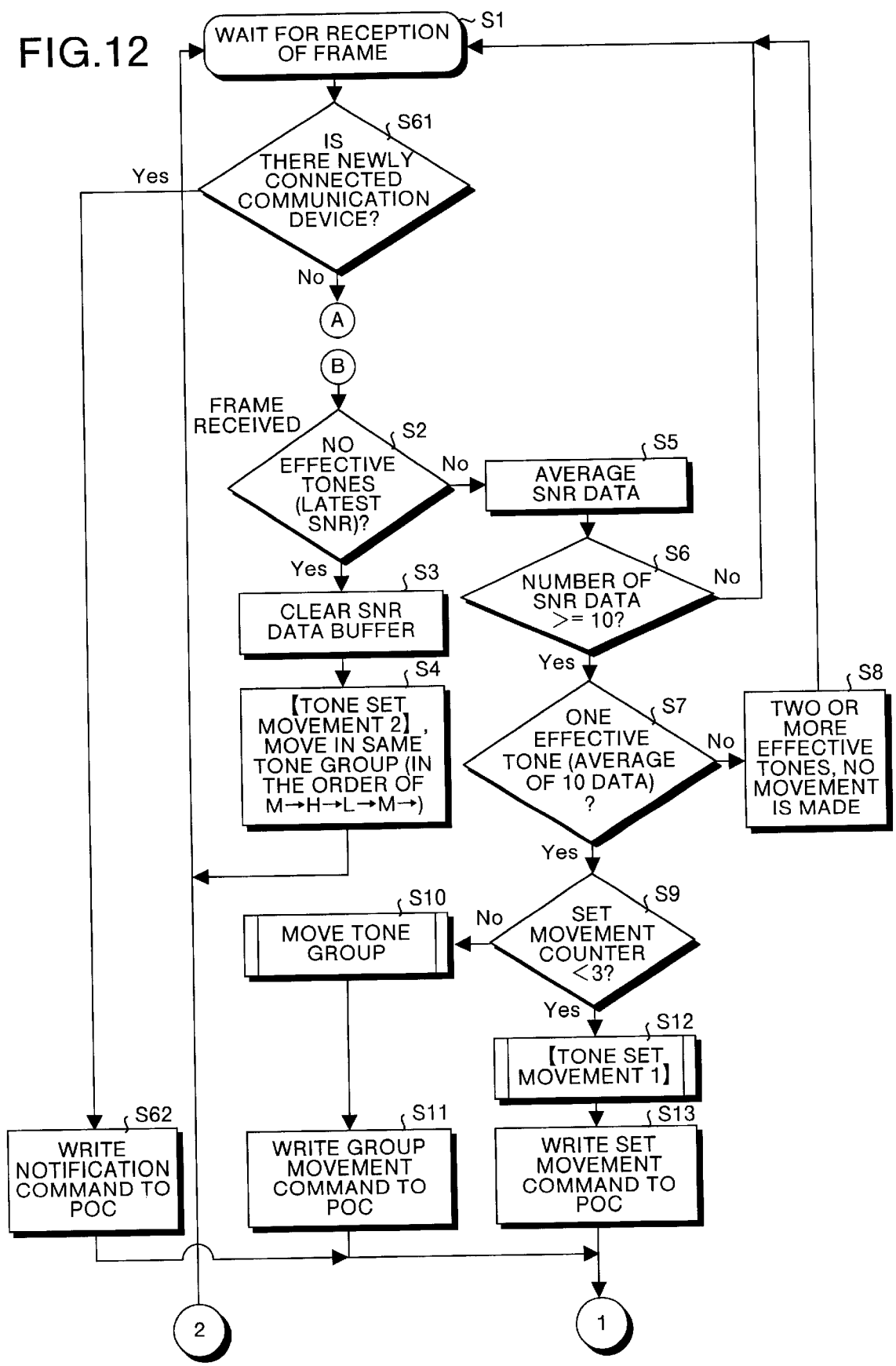
FIG. 12 is a flow chart (Example 3-1) in the first embodiment of the communication method according to the present invention.
Figure 13:
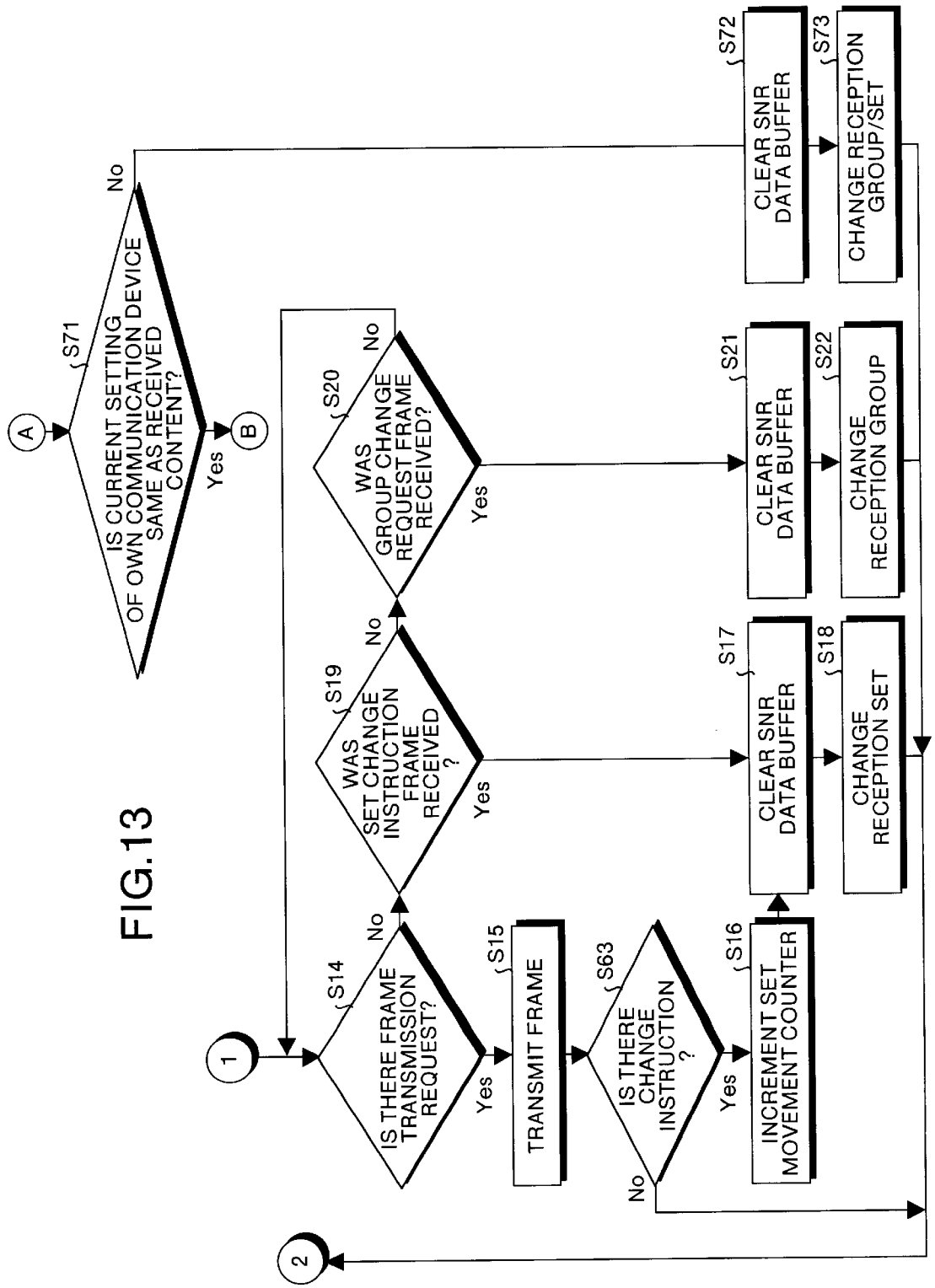
FIG. 13 is a flow chart (Example 3-2) in the first embodiment of the communication method according to the present invention.

Further, FIG. 12 and FIG. 13 show a communication method for changing a tone group and a set position while communication is held in a steady state as in the case of FIG. 10 and FIG. 11 (and FIG. 8 and FIG. 9). The communication method shown in FIG. 12 and FIG. 13 is of a follow-up response type for making a tone group and a set position movement corresponding to not only a change instruction by active tones but also to all the control commands with active tones and default tones, and of a transmission request wait type for responding to a newly connected communication device only when there is a frame transmission request (Example 3).

For example, if communication is held in a steady state in FIG. 12 and FIG. 13, the control circuit 10 of each of all the communication devices connected to the transmission line 7 monitors the transmission line 7 (in a step S1 in FIG. 12). At this moment, the control circuit 10 judges whether or not there is a communication device newly connected to the transmission line 7 (in a step S61). If there is a newly connected communication device ("Yes" in the step S61), then the control circuit 10 writes a notification command to the POC field of a frame (in a step S62), transmits the frame if there is a frame transmission request ("Yes" in a step S14 and in a step S15 in FIG. 13) and responds to the newly connected communication device.

On the other hand, if it is judged in the processing in the step S61 in FIG. 12 that there is no newly connected communication device ("No" in the step S61), then the control circuit 10 judges whether or not the present setting of the communication device in which the control circuit 10 is provided is the same as the setting of the frame received from the other communication device (in a step S71 in FIG. 13). If the settings are not the same, for example, ("No" in the step S71), then the control circuit 10 executes the clearing of the SNR data buffer (in a step S72), executes a tone group and set position movement (in a step S73) and then returns to a frame reception wait state (in a step S1 in FIG. 12). If the settings are the same ("Yes" in the step S71 in FIG. 13), then the control circuit 10 checks whether there are effective tones (in a step S2 in FIG. 12), i.e., whether three active tones maintain an S/N ratio (BER) equal to or higher than a predetermined threshold value. The remaining steps are the same as those in FIG. 8 and FIG. 9 stated above, which description will not be given herein.

Figure 14:
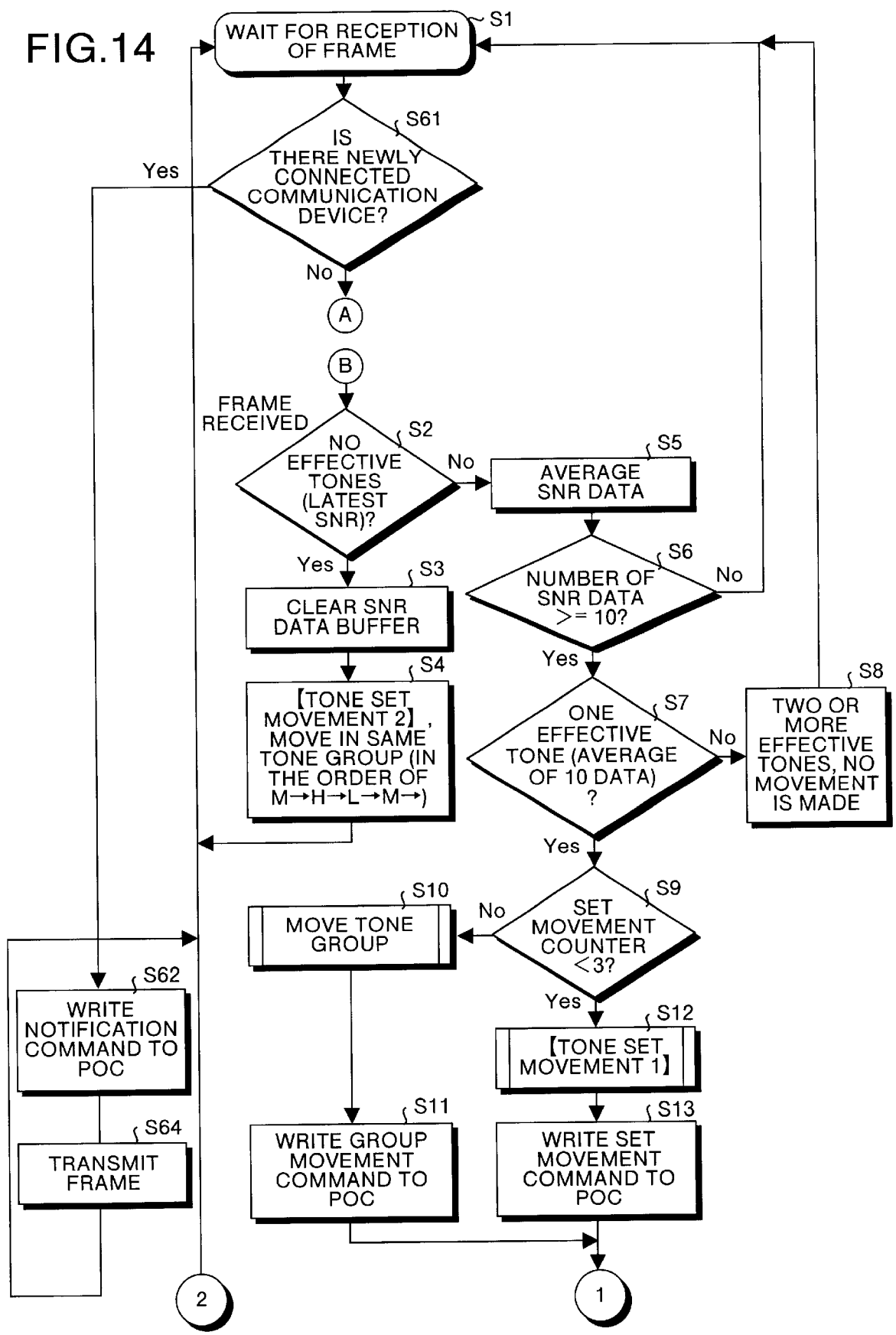
FIG. 14 is a flow chart (Example 4-1) in the first embodiment of the communication method according to the present invention.
Figure 15:
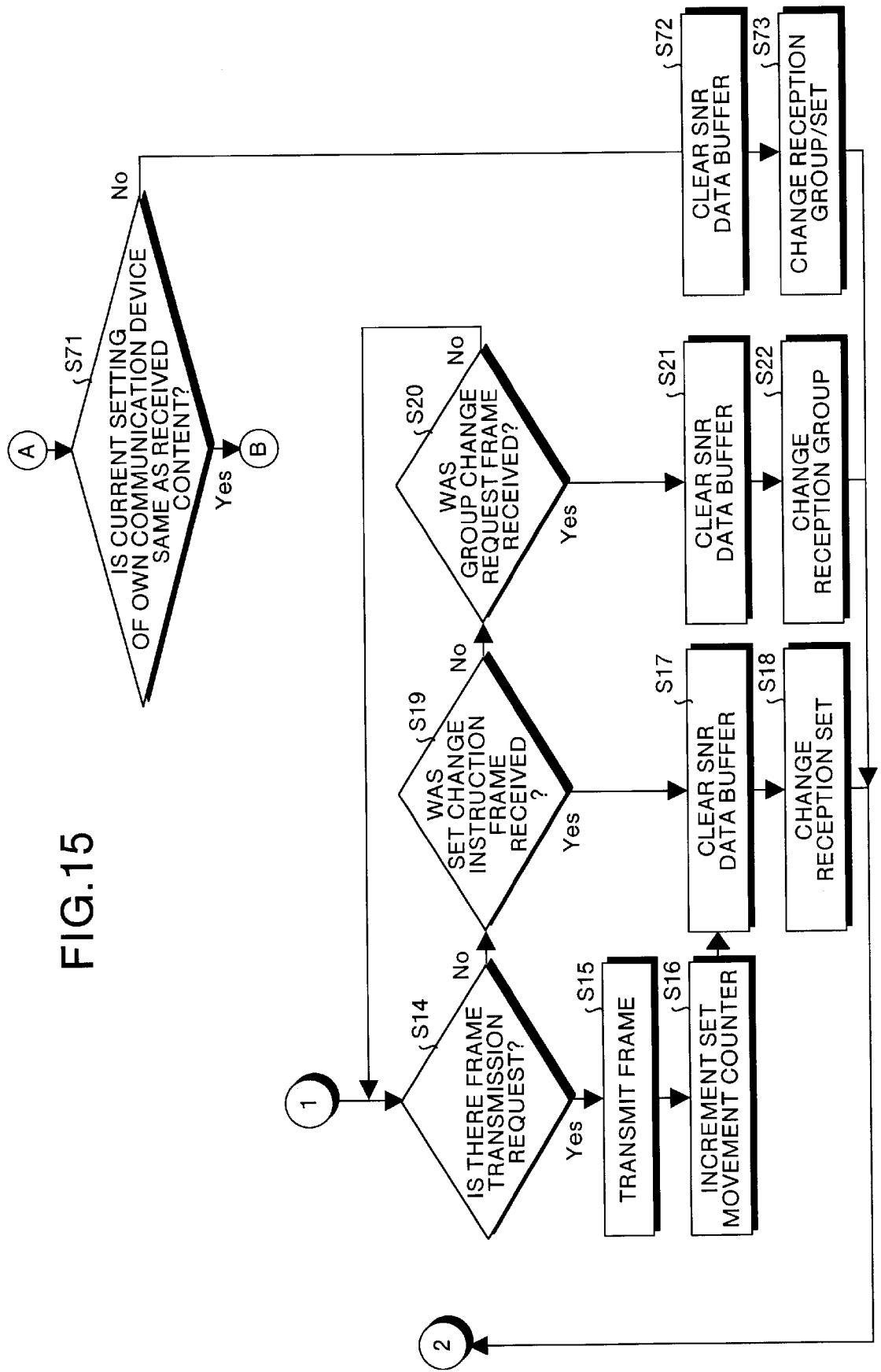
FIG. 15 is a flow chart (Example 4-2) in the first embodiment of the communication method according to the present invention.

Moreover, FIG. 14 and FIG. 15 show a communication method for changing a tone group and a set position while communication is held in a steady state as in the case of FIG. 8 to FIG. 13. The method shown in FIG. 14 and FIG. 15 is of a follow-up response type for making a tone group and set position movement corresponding to not only a change instruction by active tones but also to all the control commands with the active tones and the default tones, and of a prompt response type for responding to a newly connected control device (Example 4). Since the communication method shown in FIG. 14 and FIG. 15 is a combination of the method shown in FIG. 10 and FIG. 11 and that shown in FIG. 12 and FIG. 13 already stated above, same reference characters as those in FIG. 10 to FIG. 13 denote the same constituent elements and no description will be given thereto.

As can be seen, the communication methods shown in FIG. 10 to FIG. 15 can obtain the same advantages as those of the above-described communication method shown in FIG. 8 and FIG. 9.

In the first embodiment, tones having a high S/N ratio are actively detected so that the S/N ratio becomes equal to or higher than a predetermined threshold value, and tone movement is made soon after the tones are detected, thereby constantly maintaining high level, fixed communication quality even in the communication environment greatly influence by noise without deteriorating characteristics. In this embodiment, not only the tone movement can be made but also primary modulation modes having different noise resistances are made selectable. By selecting one primary modulation mode based on a predetermined standard, it is possible to maintain higher level, fixed communication quality.

Figure 16:
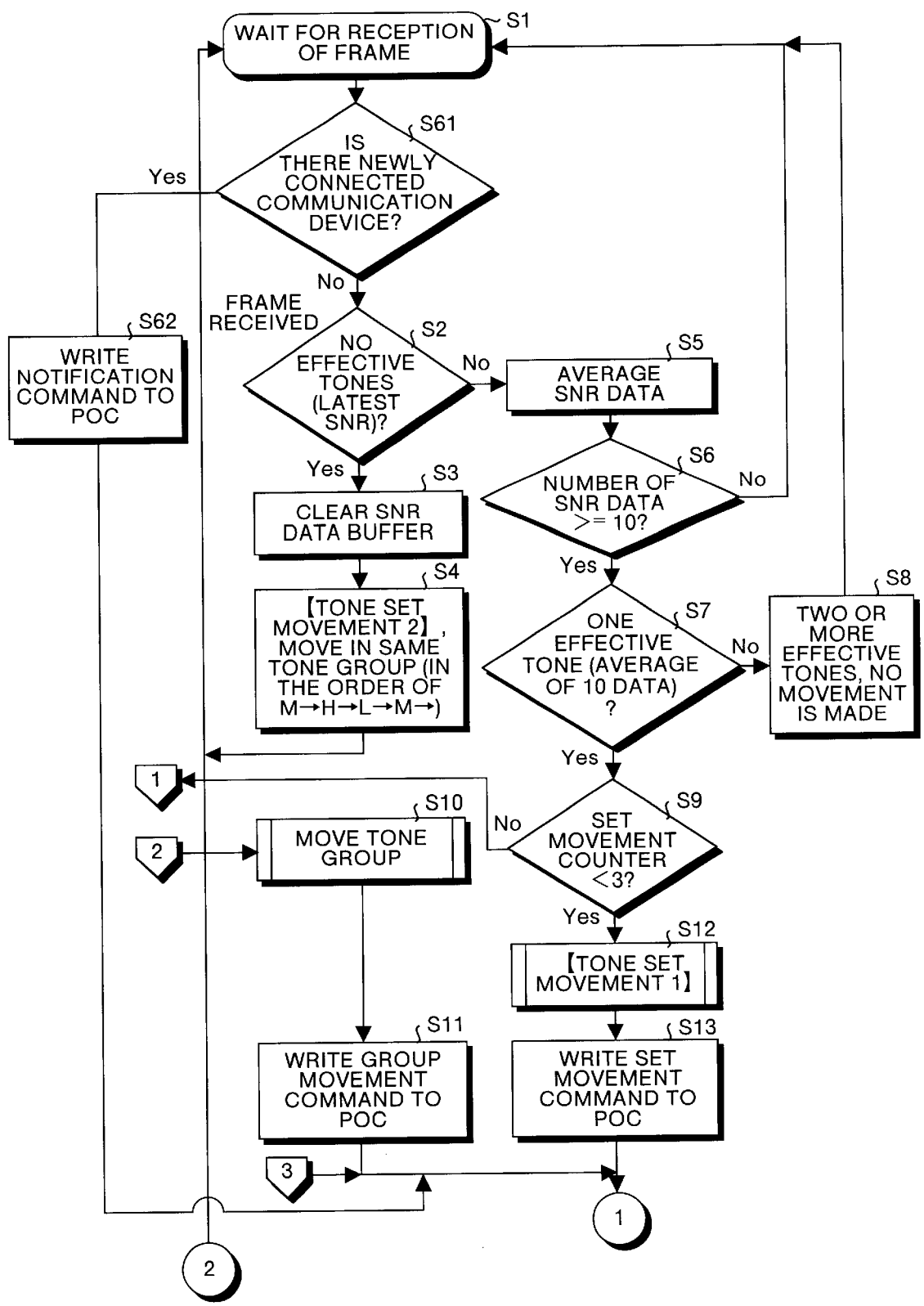
FIG. 16 is a flow chart (Example 1-1) in a second embodiment of the communication method according to the present invention.
Figure 17:
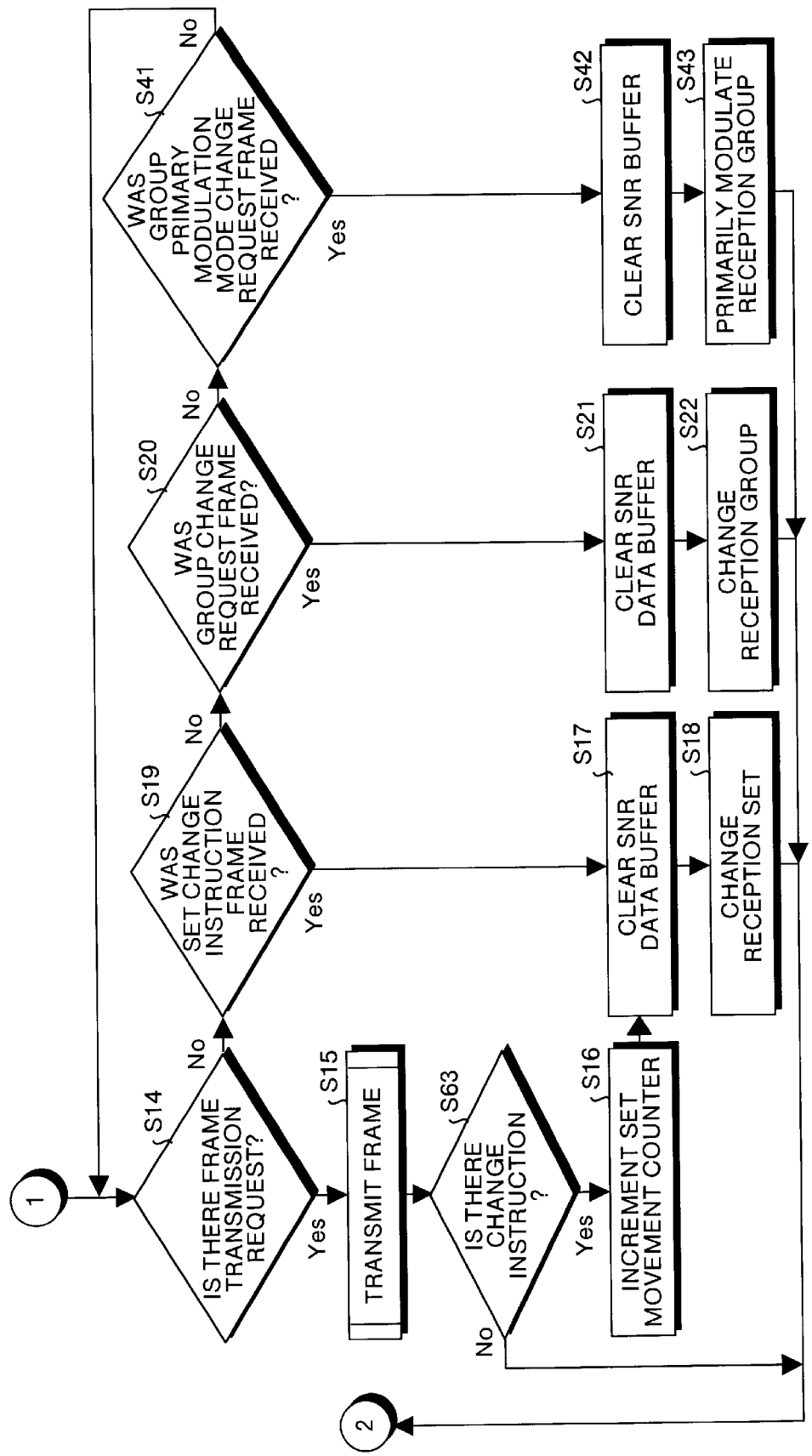
FIG. 17 is a flow chart (Example 1-2) in the second embodiment of the communication method according to the present invention.
Figure 18:
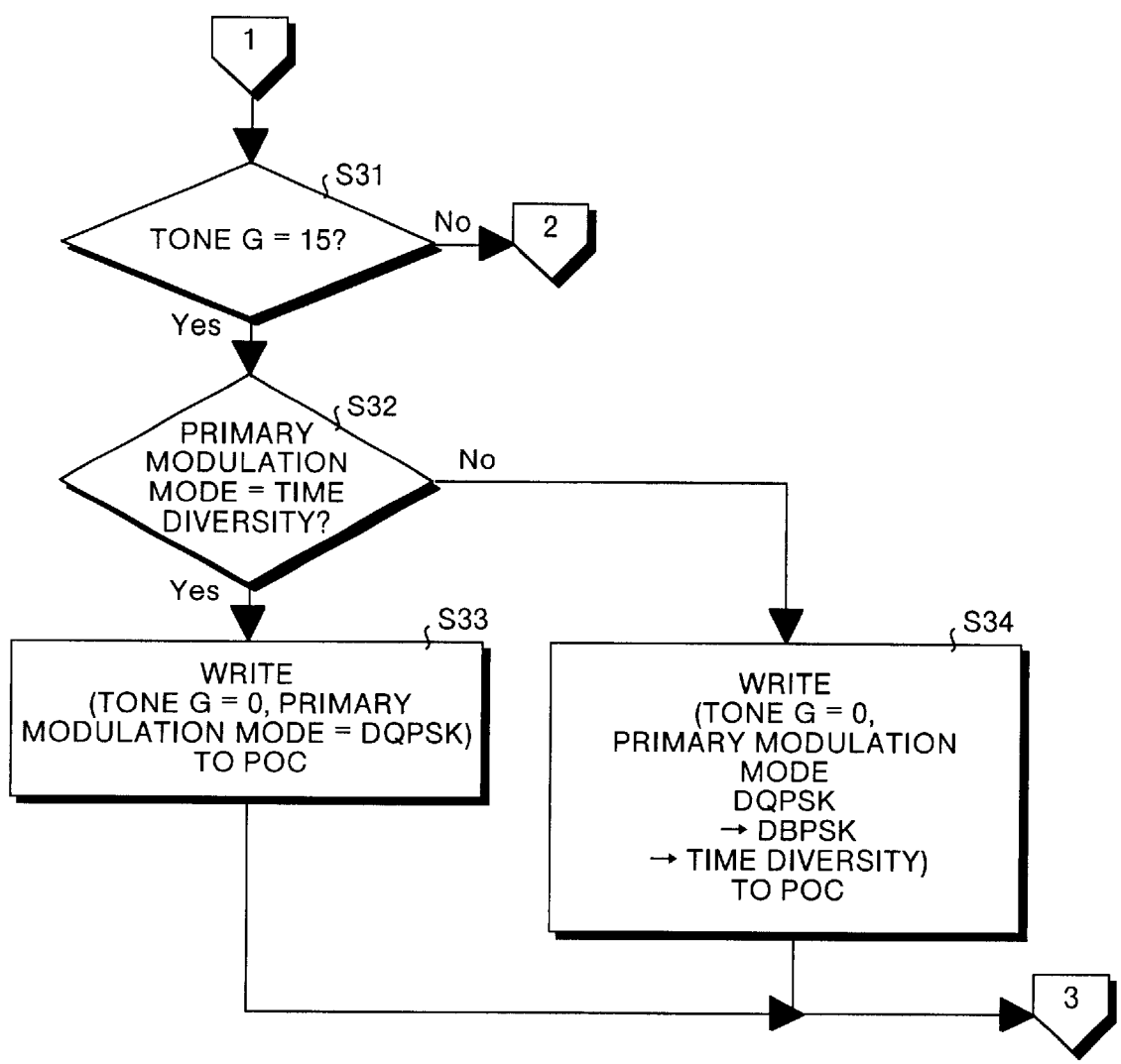
FIG. 18 is a flow chart for the second embodiment of the communication method according to the present invention.

FIG. 16, FIG. 17 and FIG. 18 are flow charts of the second embodiment of the communication method according to the present invention. In this embodiment, an explanation will be given about a case of changing a tone group and a set position and changing a primary modulation mode while communication is held in a steady state. Since the constitution of the communication device in this embodiment is the same as that of the communication device in the first embodiment stated above, the same reference characters as those in the first embodiment denote the same constituent elements and no description will be given herein to the constituent elements. In addition, the same steps as those in the first embodiment shown in FIG. 8 and FIG. 9 are denoted by the same reference characters and will not be described herein.

In a processing in a step S7 shown in FIG. 16, for example, if the number of effective tones is one ("Yes" in the step S7 in FIG. 16), then a control circuit 10 checks an internal set movement counter (not shown) (in a step S9). If it is found that a counter value is equal to or lower than 2 as a result of checking ("Yes" in the step S9), the control circuit 10 executes the same processing as that in the first embodiment. If it is found that the counter value is 3 as a result of checking ("No" in the step S9), the control circuit 10 judges that there is no tone set capable of maintaining communication quality in a tone group currently used for communication and changes the tone group in the order of tone group 0→1→3 . . . →15 (in a step S31 in FIG. 18).

Therefore, if the current tone group is one of the tone groups 0 to 14 ("No" in the step S31), the control circuit 10 selects a tone group next to the tone group currently used for communication (in a step S10 in FIG. 16) and then writes a tone group movement command (communication setting change-instruction command in FIG. 3(b)) (in a step 51). If the current tone group is tone group 15 ("Yes" in the step S31 in FIG. 18), the control circuit 10 checks the current primary modulation mode (in a step S32). In this embodiment, it is assumed that the primary modulation mode is set in the order of DQPSK→DBPSK→DBPSK+ time diversity→ . . . .

As a result of checking, if the current primary modulation mode is DQPSK ("No" in the step S32), the control circuit 10 controls the modulation mode to be changed to DBPSK and writes a modulation mode change command (communication setting change—instruction command in FIG. 3(b)) to the POC of a frame (in a step S34). If the current primary modulation mode is DBPSK ("No" in the step S32), the control circuit 10 controls the modulation mode to be changed to DBPSK+time diversity and writes a modulation mode change command (communication setting change—instruction command in FIG. 3(b)) to the POC (in the step S34). If the current primary modulation mode is DBPSK+time diversity ("Yes" in the step S32), the control circuit 10 returns the modulation mode and the set position to the respective default values (tone group 0; primary modulation mode: DQPSK) and writes the contents thereof to the POC (in the step S33).

In this state (in which the movement command to move either the tone set or the tone group is written to the POC) the control circuit 10 judges whether or not there is a frame transmission request to the communication device which the control circuit 10 is provided (whether to transmit user data). If there is a frame transmission request ("Yes" in a step S14 in FIG. 17), then the communication device transmits a preset POC field, together with an ordinary frame (in a step S15), executes the increment of the set movement counter (in a step S16) and the clearing of the SNR data buffer (in a step S17). After executing the tone movement (in a step S18), the communication device returns to a frame reception wait state (in a step S1 in FIG. 16).

In the above-described state, if a certain communication device receives a set change instruction frame from the other communication device before a frame transmission request is to the communication device occurs ("No" in the step S14 and "Yes" in the step S19 in FIG. 17), then the communication device clears the SNR data buffer (in the step S17), executes a tone movement (in the step S18) and then returns to the frame reception wait state (in the step S1 in FIG. 16). Further, in this state, if the certain communication device receives a group change request frame from the other communication device before a frame transmission request to the certain communication device occurs ("No" in the step S14, "No" in the step S19 and "Yes" in the step S20 in FIG. 17), then the certain communication device executes the clearing of the SNR data buffer (in a step S21), executes a tone group movement (in a step S22) and then returns to the frame reception wait state (in the step S1 in FIG. 16). Moreover, in the above state, if the certain communication device receives a group primary mode request frame from the other communication device before a frame transmission request to the certain communication device occurs ("No" in the step S14, "No" in the step S19, "No" in the step S20 and "Yes" in the step S41 in FIG. 17), then the certain communication device executes the clearing of the SNR data buffer (in a step S42), executes the tone group movement and the primary modulation mode change (in a step S43) and then returns to the frame reception wait state (in the step S1 in FIG. 16).

As can be seen from the above, in this embodiment, tones having a high S/N ratio are actively detected so that the S/N ratio constantly becomes equal to or higher than a predetermined threshold value and the tone movement is executed soon after the tones are detected, thereby constantly holding communication with optimum tones. Besides, primary modulation modes having different noise resistances are made selectable and one of the modes is selected based on a predetermined standard, whereby it is possible to maintain higher level, fixed communication quality even in the communication environment greatly influenced by noise without deteriorating characteristics.

Figure 19:
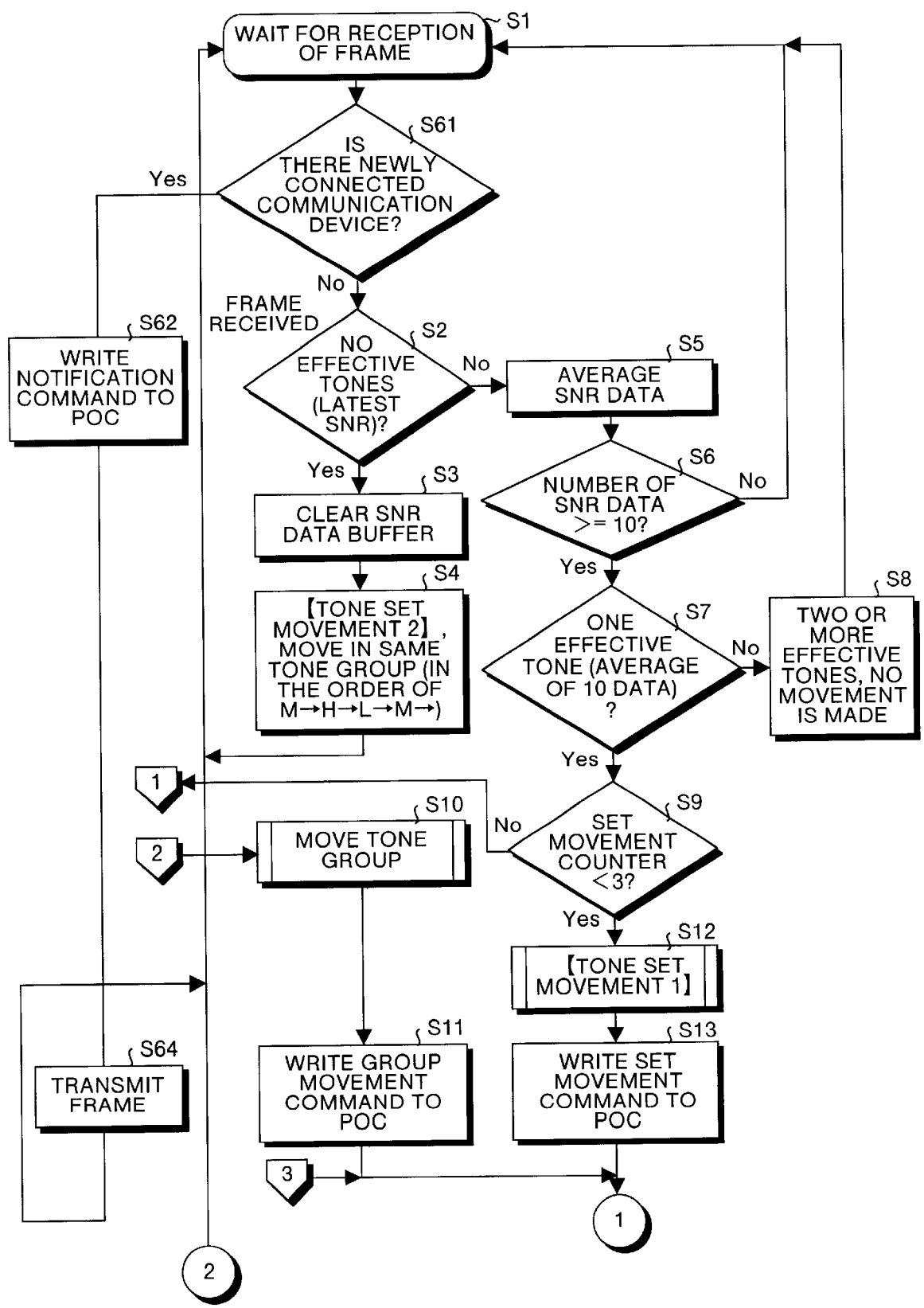
FIG. 19 is a flow chart (Example 2-1) in the second embodiment of the communication method according to the present invention.
Figure 20:
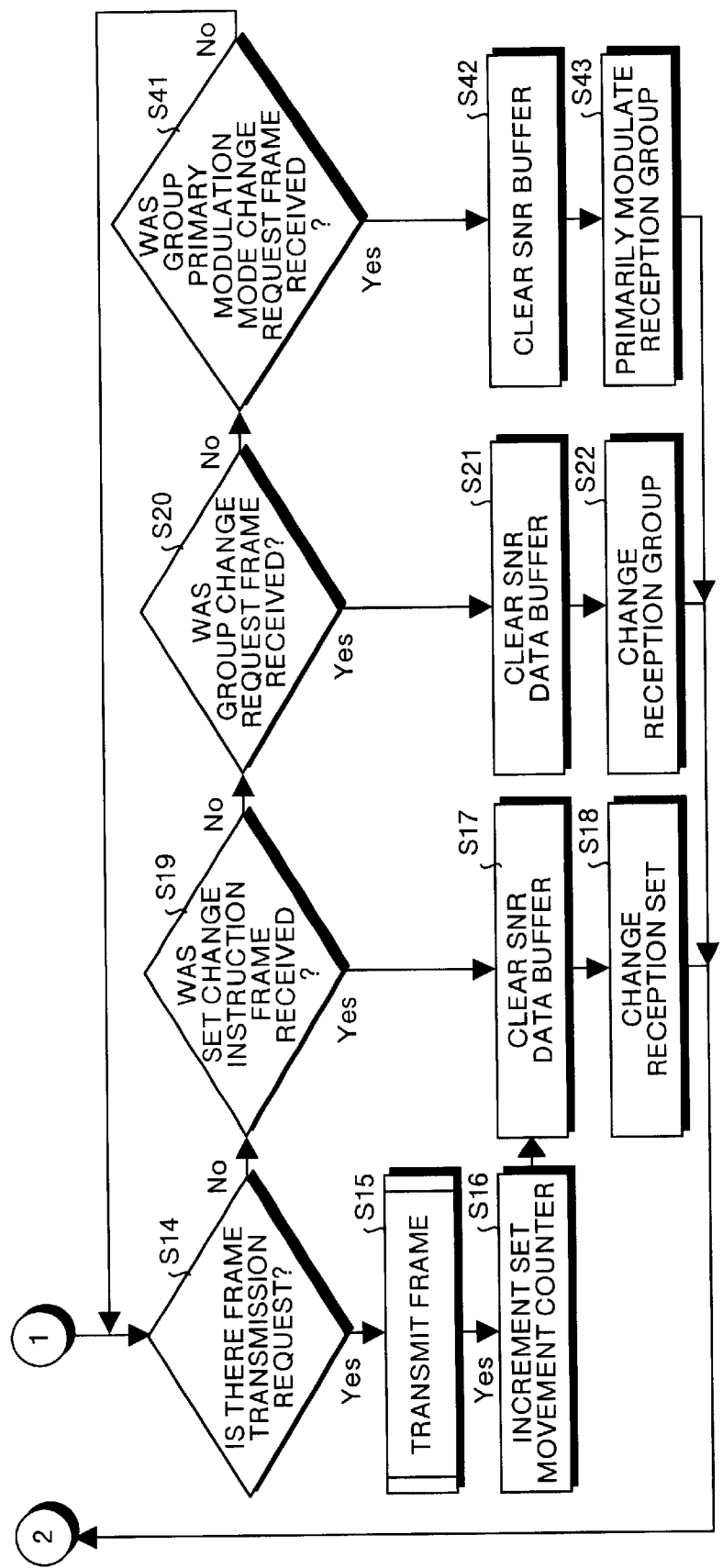
FIG. 20 is a flow chart (Example 2-2) in the second embodiment of the communication method according to the present invention.

FIG. 19 and FIG. 20 show a communication method for changing atone group, a set position and a primary modulation mode while communication is held in a steady state as in the case of FIG. 16 and FIG. 17. The communication method shown in FIG. 19 and FIG. 20 is of a change instruction response type for making a tone group, set position and primary modulation mode movement only when there is a change instruction with active tones and of a prompt response type for responding to a newly connected communication device (Example 2). This method corresponds to the communication method described above with reference to FIG. 10 and FIG. 11.

Figure 21:
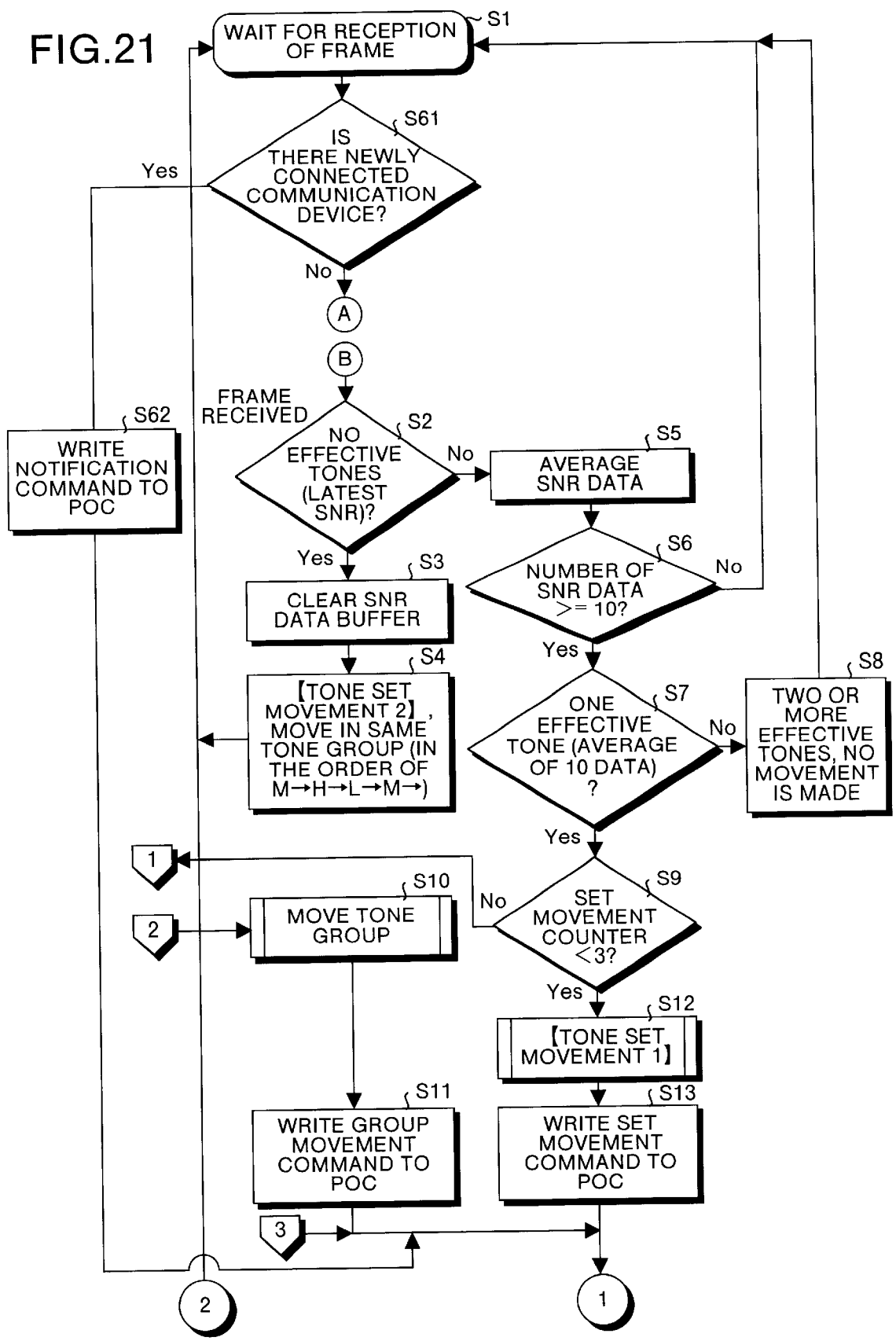
FIG. 21 is a flow chart (Example 3-1) in the second embodiment of the communication method according to the present invention.
Figure 22:
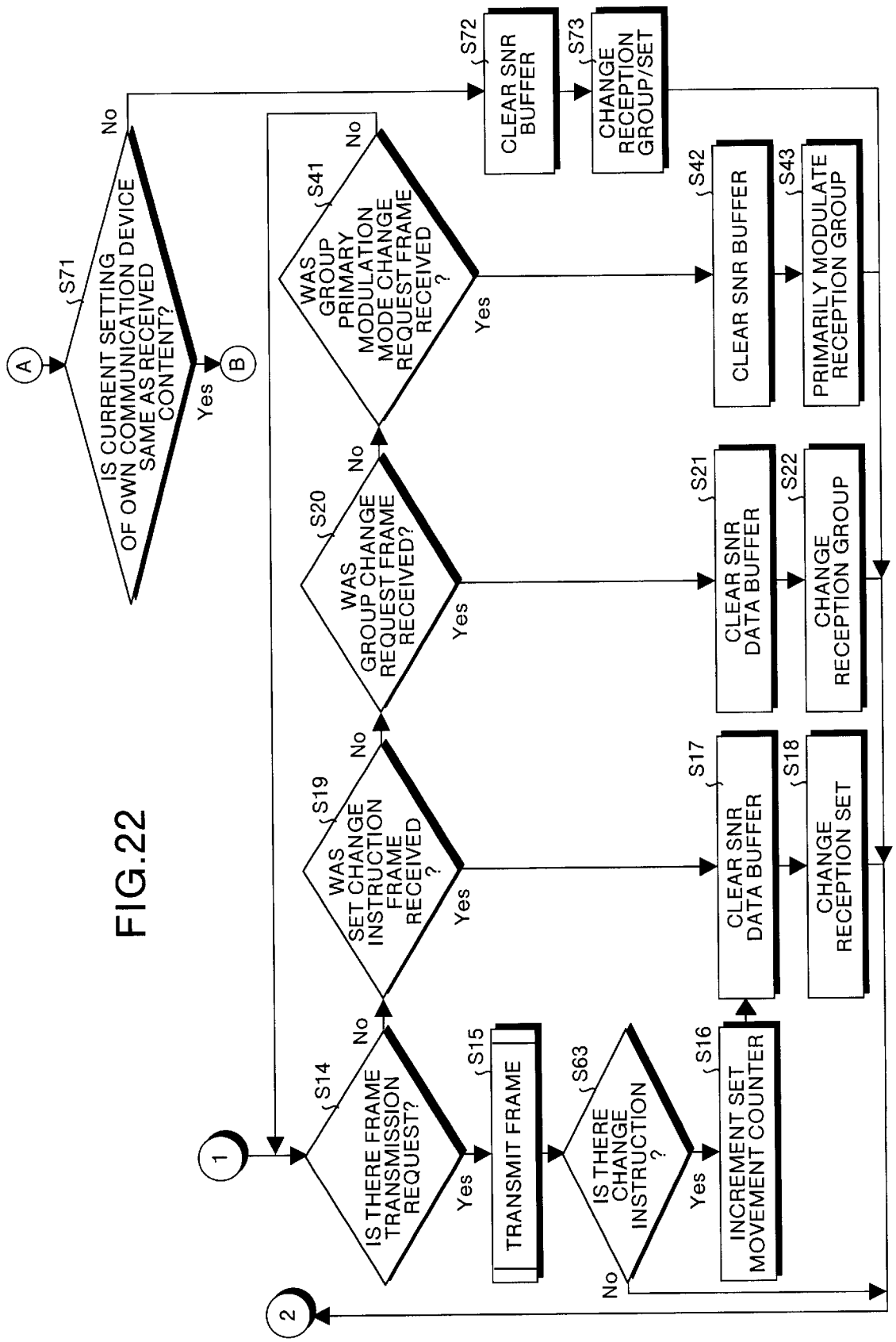
FIG. 22 is a flow chart (Example 3-2) in the second embodiment of the communication method according to the present invention.

Further, FIG. 21 and FIG. 22 show a communication method for changing a tone group, a set position and a primary modulation mode while communication is held in a steady state as in the case of the method shown in FIG. 16 and FIG. 17 or FIG. 19 and FIG. 20. The communication method shown in FIG. 21 and FIG. 22 is of a follow-up response type for making a tone group, the set position and primary modulation mode movement corresponding to not only a change instruction with active tones but also to all the control commands with active tones and default tones, and of a transmission request wait type for responding to a newly connected communication device only when a frame transmission request is issued (Example 3). This method corresponds to the communication method shown described above with reference to FIG. 12 and FIG. 13.

Figure 23:
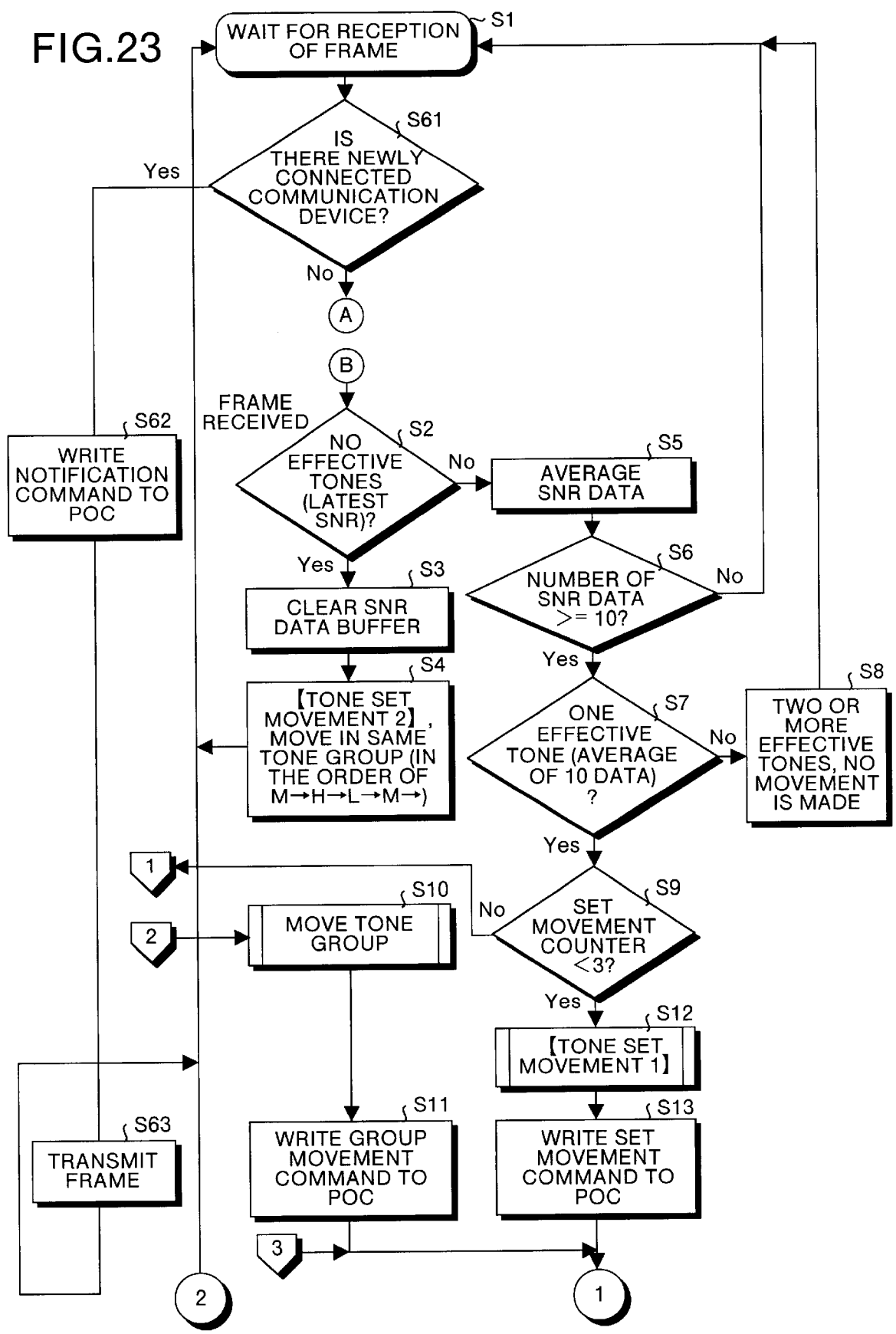
FIG. 23 is a flow chart (Example 4-1) in the second embodiment of the communication method according to the present invention.
Figure 24:
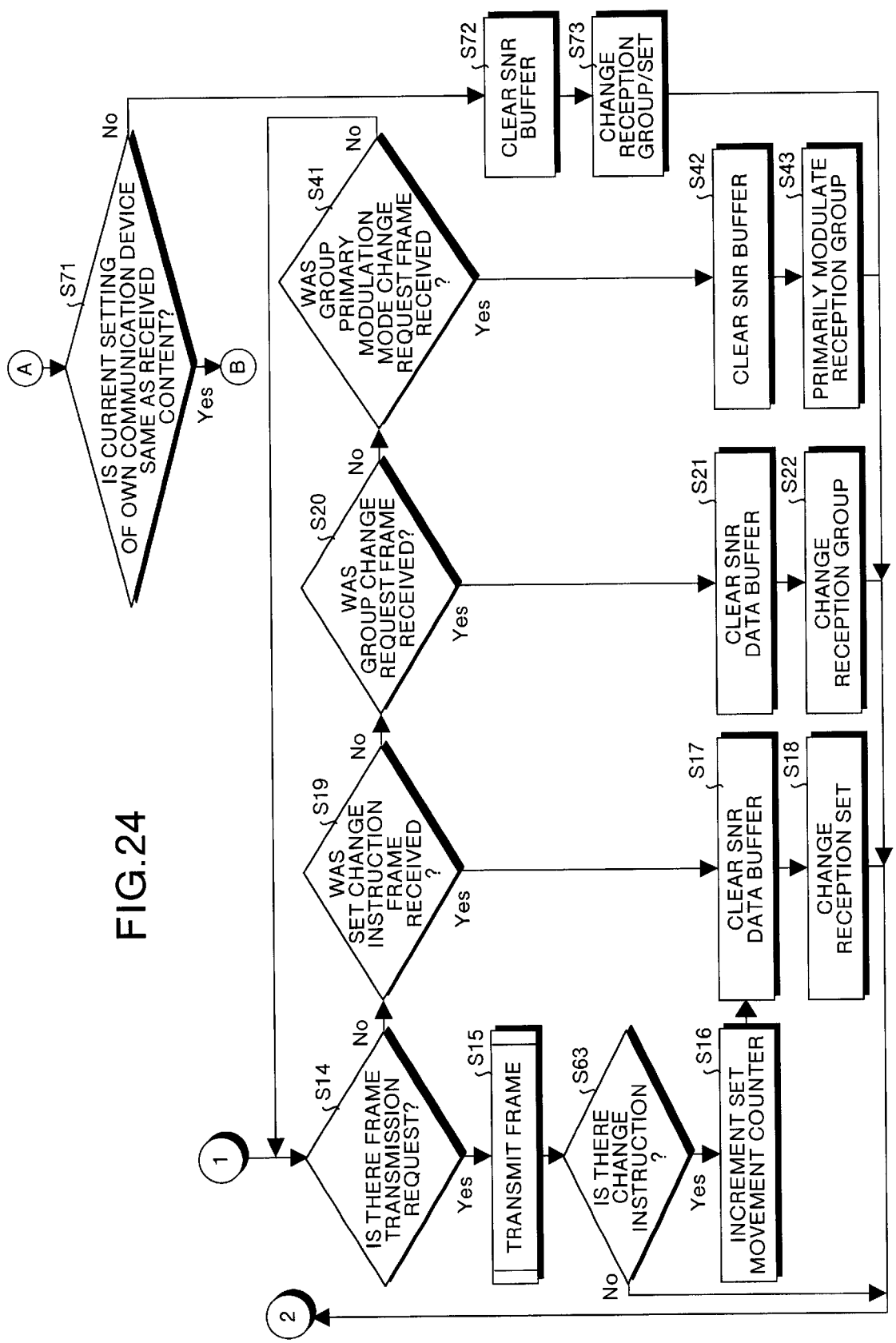
FIG. 24 is a flow chart (Example 4-2) in the second embodiment of the communication method according to the present invention.

Moreover, FIG. 23 and FIG. 24 show a communication method for changing a tone group, a set position and a primary modulation mode while communication is held in a steady state as in the case of the method shown in FIG. 16 and FIG. 17, FIG. 19 and FIG. 20, and FIG. 21 and FIG. 22. The communication method shown in FIG. 23 and FIG. 24 is of a follow-up response type method for making a tone group, set position and primary modulation mode movement corresponding to not only a change instruction with active tones but also all the control commands with active tones and default tones, and of a prompt response type for responding to a newly connected communication device (Example 4). This method corresponds to the communication method described above with reference to FIG. 14 and FIG. 15.

In the first and second embodiments, description has been given to a case of changing a tone group and a set position and changing a primary modulation mode while communication is held in a steady state. Next, an explanation will be given about an operation for changing a tone group, a set position and a primary modulation mode conducted by a communication device newly connected to the transmission line.

Figure 25:
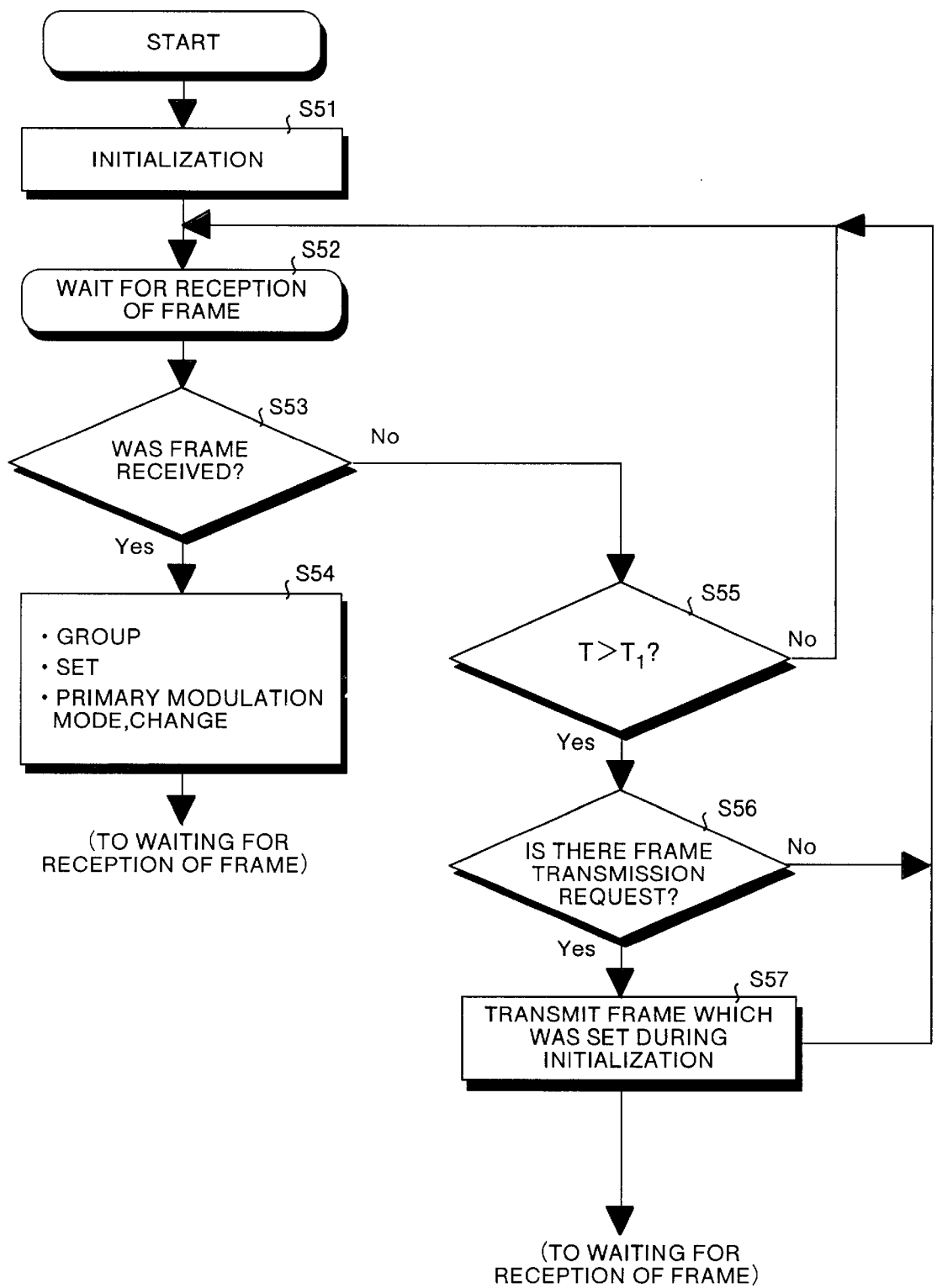
FIG. 25 is a flow chart in a third embodiment of the communication method according to the present invention.

FIG. 25 is a flow chart of in a third embodiment of the communication method according to the present invention. It is noted that this embodiment illustrates an operation before the flow charts described in the first and second embodiments, and when the processings in the flow charts are finished, the processings in the step 1 in FIG. 8, FIG. 10, FIG. 12, FIG. 14, FIG. 16, FIG. 19, FIG. 21 and FIG. 23 are executed. Further, the flow chart shown in FIG. 25 corresponds to the second embodiment. Therefore, if the flow chart shown in FIG. 25 is made to correspond to the first embodiment, a primary modulation mode change operation in a step S54 is not carried out.

When a certain communication device is connected to the transmission line 7 and power is turned on in this state, the communication device is initialized first (in a step S52 in FIG. 25) and then turns into a frame reception wait state (in a step S52) This initialization includes a timer reset processing to be described later, and default tone group and default set position settings shown in FIG. 4 and FIG. 5. Further, when the communication device turns into the wait state, a timer starts.

For example, if the value T of the timer is equal to or lower than a predetermined value $T_1$ and the communication device receives the frames of a default tone set (in a step S53), the control circuit 10 grasps the content of the frames and changes the positions of a tone group, a set position and a primary modulation mode to those of an active tone set currently used for communication (in a step S54). In this sate, the certain communication device turns into a frame wait state.

On the other hand, if the communication device waits to receive the default tone set (in the step S52, "No" in the step S53 and "No" in the step S55) and cannot receive the frame of the default tone set even with the timer value T exceeding the predetermined value $T_1$ ("No" in the step S53 and "Yes" in the step S55), then the control circuit 10 judges whether or not a frame transmission request is issued (in a step S56). If there is no request ("No" in the step S56), the communication device turns into the frame reception wait state again (in the step S52). If there is a request ("Yes" in the step S56), the communication device transmits the frame of the tone set which was set in the initialization (in a step S57). In this state, the communication device turns into a normal frame reception wait state (in the steps S1 in FIG. 8, FIG. 10, FIG. 12, FIG. 14, FIG. 16, FIG. 19, FIG. 21 and FIG. 23). The other communication devices which hold communication in a steady state, write a communication command to the POC of the frame in response to the transmission frame from this newly connected communication device, and transmit the frame. By doing so, the newly connected communication device can follow up the changes (of tone groups, set positions and primary modulation modes) of the other communication devices.

As can be understood from the above, in this embodiment, a newly connected communication device can easily grasp the positions of active tones by checking the default tones. Besides, even if power is turned on and no communication is held on the transmission line, the communication device can change the tone group and set position of the active tone set and the primary modulation mode by the transmission of a frame from the communication device, thereby making it possible to easily follow up the active tones of the other communication devices.

As stated so far, according to the present invention, all of the communication devices connected to the transmission line cannot output the rejection of change, tones having a high S/N ratio are actively detected so that high transmission rate can be constantly maintained, i.e., the S/N ratio is maintained to be equal to or higher than a predetermined threshold value, and tone movement is made soon after the tones are detected, thereby constantly holding communication with optimum tones. Thus, it is possible to advanta- geously obtain a communication method capable of constantly maintaining high level, fixed communication quality without deteriorating characteristics even in the communication environment greatly influenced by noise.

Furthermore, even a newly connected communication device can easily grasp the positions of the active tones by checking the default tones. Besides, even if power is turned on and no communication is held on the transmission line, the communication device can change the tone group and set position of the active tone set by the transmission of a frame from the communication device. Thus, it is possible to advantageously obtain a communication method capable of easily following up the active tones of the other communication devices.

Furthermore, tones having a high S/N ratio are actively detected so that the S/N ratio becomes equal to or higher than a predetermined threshold value, and tone movement is made soon after the tones are detected, thereby constantly holding communication with optimum tones. Besides, primary modulation modes having different noise resistances are made selectable and selected based on a predetermined standard. Thus, it is possible to advantageously obtain a communication device capable of maintaining higher level, fixed communication quality even in the communication environment greatly influenced by noise without deteriorating characteristics.

Furthermore, even a newly connected communication device can easily grasp the positions of the active tones by checking the default tones. Besides, even if power is turned on and no communication is held on the transmission line, the communication device can change the tone group and set position of the active tone set by the transmission of a frame from the communication device. Thus, it is possible to advantageously obtain a communication method capable of easily following up the active tones of the other communication devices.

Furthermore, it is possible to advantageously take account of characteristics and simplicity by selecting the primary modulation mode in the order of DQPSK, DBPSK and BPSK+time diversity, and to advantageously execute all the modulation modes with high efficiency.

Furthermore, by moving the position of the tone set in the same tone group in a frequency ascending order or a frequency descending order, it is advantageously possible to efficiently move all the tone sets without exception.

Furthermore, by moving the position of a tone set so that a good tone is at the center of the tone set based on a result of checking whether a specific standard is satisfied, it is advantageously possible to move to an optimum tone set.

Furthermore, by moving tone groups in the order of tone group numbers, it is advantageously possible to efficiently move all the tone groups without exception.

Furthermore, a newly connected communication device which has not been able to follow up other communication device which are holding communication in a steady state, can be advantageously notified of the position of the active tone set.

Furthermore, tones having a high S/N ratio are actively detected so that high transmission rate can be constantly maintained, i.e., the S/N ratio is maintained to be equal to or higher than a predetermined threshold value, and tone movement is made soon after the tones are detected, thereby constantly holding communication with optimum tones. Thus, it is possible to advantageously obtain a communication device capable of constantly maintaining high level, fixed communication quality without deteriorating characteristics even in the communication environment greatly influenced by noise.

Furthermore, even a newly connected communication device can easily grasp the positions of active tones by checking the default tones. Besides, even if power is turned on and no communication is held on the transmission line, the communication device can change the tone group and set position of the active tone set by the transmission of a frame from the communication device. Thus, it is possible to advantageously obtain a communication device capable of easily following up the active tones of the other communication devices.

Furthermore, tones having a high S/N ratio are actively detected so that the S/N ratio becomes equal to or higher than a predetermined threshold value, and tone movement is made soon after the tones are detected, thereby constantly holding communication with optimum tones. Besides, primary modulation modes having different noise resistances are made selectable and selected based on a predetermined standard. Thus, it is possible to advantageously obtain a communication device capable of maintaining higher level, fixed communication quality without deteriorating characteristics even in the communication environment greatly influenced by noise.

Furthermore, even a newly connected communication device can easily grasp the positions of active tones by checking the default tones. Besides, even if power is turned on and no communication is held on the transmission line, the communication device can change the tone group and set position of the active tone set and the primary modulation mode by the transmission of a frame from the communication device. Thus, it is possible to advantageously obtain a communication device capable of easily following up the active tones of the other communication devices.

INDUSTRIAL APPLICABILITY

As stated so far, the communication method and the communication device according to the present invention are effective for communication using a transmission line which maybe possibly influenced by noise, and particularly suited for a power line modem holding data communication using an existing power line (electric light power line).

What is claimed is:

1. A communication method of adopting a multi-carrier modulation-demodulation mode as a communication mode for data communication to be held among a plurality of communication devices connected to a transmission line, and selecting tones less influenced by noise and thereby maintaining fixed communication quality, the method comprising:

a first tone set changing step of monitoring the transmission line while the communication is held in a steady state, and judging that the communication quality cannot be maintained and changing a tone set by a predetermined method if there are no tones securing a specific standard;

a second tone set changing step of judging that the certain communication quality can be maintained and not changing the tone set if the number of tones securing the specific standard is equal to or higher than a predetermined number, and changing the tone set by the predetermined method if the number of the tones securing the specific standard is less than the predetermined number and it is judged that the communication quality can be maintained by changing the tone set in a same tone group; and a tone group movement step of changing the tone group by a predetermined method if it is judged that the communication quality cannot be maintained even by changing the tone set in the same tone group.

2. The communication method according to claim 1, further comprising:

a change step of recognizing a present state by monitoring a fixed tone set to which a position of a tone set currently used for communication is written, at a time of turning on power, and changing the tone set to the present state; and a frame transmission step of transmitting a frame using a tone set which has been set during initialization and waiting for a response from other communication devices if the fixed tone set cannot be received.

3. The communication method according to claim 1, further comprising:

a primary modulation mode selection step of selecting one of primary modulation modes having different noise resistances based on a predetermined standard if it is judged that the communication quality cannot be maintained even by making the primary modulation modes having different noise resistances selectable, executing changing of the tone set in the same tone group and executing changing of the tone group.

4. The communication method according to claim 3, further comprising:

a change step of recognizing a present state by monitoring a fixed tone set to which a position of a tone set currently used for communication and a primary modulation mode are written, at a time of turning on power, and changing the tone set to the present state; and a frame transmission step of transmitting a frame using a tone set which has been set during initialization and waiting for a response from other communication devices if the fixed tone set cannot be received.

5. The communication method according to claim 3, wherein in the primary modulation mode selection step, a DQPSK mode, a DBPSK mode and a BPSK+time diversity mode are selected as the primary modulation mode in this order.

6. The communication method according to claim 1, wherein in the first tone set movement step, the position of the tone set in the same tone group is gradually moved from either a low frequency side or a high frequency side.

7. The communication method according to claim 1, wherein in the second tone set changing step, the position of the tone set is changed so that a good tone is located at a center based on a result of checking whether the specific standard can be secured.

8. The communication method according to claim 1, wherein in the tone group changing step, the tone group is changed in an order of tone group numbers.

9. The communication method according to claim 1, wherein if a frame is received from a newly connected communication device, information on a tone set currently used for communication is put on a fixed tone set and transmitted.

10. A communication device which adopts, a multi-carrier modulation-demodulation mode as a communication mode for data communication to be held among a plurality of communication devices connected to a transmission line, and selects tones less influenced by noise and thereby maintaining fixed communication quality, comprising:

a controller for performing the steps of:

monitoring the transmission line while the communication is held in a steady state, judging that the communication quality cannot be maintained, and changing a tone set by a predetermined method if there are no tones securing a specific standard;

determining that the certain communication quality can be maintained and not changing the tone set if the number of tones securing the specific standard is equal to or higher than a predetermined number, and changing the none set by the predetermined method if the number of the tones securing the specific standard is less than the predetermined number and determining that the communication quality can be maintained by changing the tone set in a same tone group; and changing the tone group by a predetermined method if it is judged that the communication quality cannot be maintained even by changing the tone set in the same tone group.

11. The communication device according to claim 10, wherein the controller further performs the steps of:

determining a present state by monitoring a fixed tone set to which a position of a tone set currently used for communication is written at a time of turning on power;

changing the tone set to the present state;

transmitting a frame using a tone set which has been set during initialization; and waiting for a response from other communication devices if the fixed tone set cannot be received.

12. The communication device according to claim 10, wherein said controller to further perform the steps of:

selecting one of primary modulation modes having different noise resistances based on a predetermined standard if it is judged that the communication quality cannot be maintained even by making the primary modulation modes having different noise resistances selectable, and executing changing of the tone set in the same tone group and changing of the tone group.

13. The communication device according to claim 12, wherein the controller further performs the steps of:

determining a present state by monitoring a fixed tone set to which a position of a tone set currently used for communication and a primary modulation mode are written, at a time of turning on power; and changing the tone set to the present state;

transmitting a frame using a tone set which has been set during initialization; and waiting for a response from other communication devices if the fixed tone set cannot be received.

14. A method for changing tones in a multi-carrier communications system, comprising:

monitoring a transmission line within a multi-carrier communications system;

determining that a number of tones, exceeding a predetermined number, within a current tone set cannot satisfy a predetermined communication quality threshold; and in response, changing the tone set while staying within one tone group to satisfy said threshold.

15. The method of claim 14, wherein said determining further includes:

determining that changing the current tone set while staying within one tone group cannot satisfy said quality threshold; and in response, changing the tone set to a tone set within a different tone group.

16. The method of claim 14, further comprising:

determining that the current modulation mode cannot satisfy said quality threshold; and in response, changing the modulation mode to satisfy said threshold.

17. A communications device for changing tones in a multi-carrier communications system, comprising:

a controller for performing the steps of:

monitoring a transmission line within a multi-carrier communications system;

determining that a number of tones, exceeding a predetermined number, within a current tone set cannot satisfy a predetermined communication quality threshold; and in response, changing the tone set while staying within one tone group to satisfy said threshold.

18. The communications device of claim 17, wherein said controller further performs the steps of:

determining that changing the current tone set while staying within one tone group cannot satisfy said quality threshold; and in response, changing the tone set to a tone set within a different tone group.

19. The communications device of claim 17, wherein said controller further performs the steps of:

determining that the current modulation mode cannot satisfy said quality threshold; and in response, changing the modulation mode to satisfy said threshold.

* * * * *